(12) United States Patent
Zhang et al.

(10) Patent No.: US 12,095,859 B2
(45) Date of Patent: Sep. 17, 2024

(54) MALLEABILITY OF TRANSACTIONS FOR INCLUSION IN A BLOCKCHAIN

(71) Applicant: nChain Licensing AG, Zug (CH)

(72) Inventors: Wei Zhang, London (GB); Craig Wright, London (GB); Jack Davies, London (GB)

(73) Assignee: nChain Licensing AG, Zug (CH)

( * ) Notice: Subject to any disclaimer, the term of this patent is extended or adjusted under 35 U.S.C. 154(b) by 0 days.

(21) Appl. No.: 18/370,782

(22) Filed: Sep. 20, 2023

(65) Prior Publication Data

US 2024/0022631 A1  Jan. 18, 2024

Related U.S. Application Data

(63) Continuation of application No. 17/612,169, filed as application No. PCT/IB2020/053815 on Apr. 22, 2020.

(30) Foreign Application Priority Data

May 24, 2019 (GB) ..................................... 1907339

(51) Int. Cl.
  *H04L 67/1095* (2022.01)
  *H04L 9/00* (2022.01)
  *H04L 9/32* (2006.01)

(52) U.S. Cl.
  CPC ........ *H04L 67/1095* (2013.01); *H04L 9/3252* (2013.01); *H04L 9/50* (2022.05)

(58) Field of Classification Search
  CPC ..... H04L 67/1095; H04L 9/3252; H04L 9/50; H04L 9/3239; H04L 67/10; G06Q 20/401
  See application file for complete search history.

(56) References Cited

U.S. PATENT DOCUMENTS 8,789,180 B1  7/2014  Yang et al.
8,826,015 B2  9/2014  Lakshminarayanan et al.
(Continued)

FOREIGN PATENT DOCUMENTS

EP  3259725 A1  12/2017
ES  2875581 T3  11/2021
(Continued)

OTHER PUBLICATIONS

Aitzhan N.Z., et al., "Security and Privacy in Decentralized Energy Trading through Multi-Signatures, Blockchain and Anonymous Messaging Streams," IEEE TDSC, 2016, 14 pages.
(Continued)

*Primary Examiner* — Angelica Ruiz
(74) *Attorney, Agent, or Firm* — Messner Reeves LLP

(57) ABSTRACT

A method of recording a target transaction in a blockchain, comprising: obtaining an updated version of the target transaction, being updated relative to a pre-existing first version; and instead of the first version, sending the updated version to be propagated through a network of nodes to be recorded in the blockchain. The target transaction comprises an input comprising an unlocking script and a pointer to an output of a first transaction, the output of the first transaction comprising a locking script specifying a plurality of alternative conditions for unlocking that output. The unlocking script of the first version of the target transaction is configured to unlock the first output of the first transaction based on a first of said alternative conditions, and the unlocking script of the updated version is configured to unlock it based on a second one of said alternative conditions.

20 Claims, 9 Drawing Sheets

(56) References Cited

U.S. PATENT DOCUMENTS

| | | | |
|---|---|---|---|
| 9,621,650 | B2 | 4/2017 | Raman et al. |
| 10,250,708 | B1 | 4/2019 | Carver et al. |
| 10,521,861 | B1 | 12/2019 | Ju et al. |
| 10,776,761 | B2 | 9/2020 | MacGregor et al. |
| 2003/0023537 | A1 | 1/2003 | Joshi et al. |
| 2004/0210884 | A1 | 10/2004 | Raghavachari et al. |
| 2008/0168469 | A1 | 7/2008 | Feingold et al. |
| 2013/0218709 | A1 | 8/2013 | Jain |
| 2015/0178725 | A1 | 6/2015 | Poetsch |
| 2016/0260171 | A1 | 9/2016 | Ford et al. |
| 2017/0255912 | A1 | 9/2017 | Casebolt |
| 2018/0293629 | A1 | 10/2018 | Roman |
| 2019/0012695 | A1 | 1/2019 | Bishnoi et al. |
| 2019/0028276 | A1 | 1/2019 | Pierce et al. |
| 2019/0028278 | A1 | 1/2019 | Gilson |
| 2019/0057382 | A1 | 2/2019 | Wright et al. |
| 2019/0058910 | A1 | 2/2019 | Solow |
| 2019/0095879 | A1* | 3/2019 | Eyal ................. G06Q 20/223 |
| 2019/0095909 | A1 | 3/2019 | Wright et al. |
| 2019/0121988 | A1 | 4/2019 | Van De Ruit et al. |
| 2019/0149337 | A1 | 5/2019 | Savanah et al. |
| 2019/0205844 | A1 | 7/2019 | Nuzzi |
| 2019/0362388 | A1 | 11/2019 | Bugga et al. |
| 2020/0202350 | A1 | 6/2020 | Chan et al. |
| 2021/0217002 | A1 | 7/2021 | Basu et al. |
| 2021/0314396 | A1 | 10/2021 | Basu et al. |
| 2023/0370283 | A1* | 11/2023 | Chan ................. G06Q 20/0655 |

FOREIGN PATENT DOCUMENTS

| | | | |
|---|---|---|---|
| JP | 6487091 | B1 | 3/2019 |
| JP | 2019507446 | A | 3/2019 |
| JP | 2019511147 | A | 4/2019 |
| JP | 2019511766 | A | 4/2019 |
| WO | 2017145016 | A1 | 8/2017 |
| WO | 2017163220 | A1 | 9/2017 |
| WO | 2017178955 | A1 | 10/2017 |
| WO | 2018020389 | A2 | 2/2018 |
| WO | 2018020389 | A3 | 3/2018 |
| WO | 2018078520 | A1 | 5/2018 |
| WO | 2018092443 | A1 | 5/2018 |
| WO | 2018189667 | A1 | 10/2018 |
| WO | 2018211382 | A1 | 11/2018 |
| WO | 2019010459 | A1 | 1/2019 |
| WO | 2019034984 | A1 | 2/2019 |
| WO | 2019040855 | A1 | 2/2019 |
| WO | 2019043538 | A1 | 3/2019 |
| WO | 2019197926 | A1 | 10/2019 |
| WO | 2021127115 | A1 | 6/2021 |

OTHER PUBLICATIONS

Bitcoin Wiki, "Payment Channels," webpage, Jan. 17, 2019, Retrieved from the Internet: https://en.bitcoin.it/wiki/Payment_channels, 4 pages.

BitcoinCashSV, "Ryan X Charles has Epiphany on Importance of Malleability for Bitcoin/Metanet," Reddit discussion, Retrieved from the Internet: https://www.reddit.com/r/bitcoincashSV/comments/ar75lt/ryan_x_charles_has_epiphany_on_importance_of/ on Apr. 18, 2019, 4 pages.

Charles R.X., "Payment Channels, Craig Wright, and Money Button," webpage, YouTube post, Feb. 14, 2019, Retrieved from the Internet: https://www.youtube.com/watch?v=S6rd1KbF7sc, 2 pages.

Hung R., "Bitcoin Timelocks in a Nutshell," webpage, Oct. 21, 2017, Retrieved from the Internet: https://medium.com/@RobinHung/bitcoin-timelocks-in-a-nutshell-4c95aafc7a59, 7 pages.

Radhakrishnan R., at al., "Streaming Data Payment Protocol (SDPP) for the Internet of Things," IEEE Confs on Internet of Things, 2018, pp. 1679-1684.

Shadders, "On Forks, Orphans and Reorgs," Retrieved from the Internet: https://www.yours.org/content/on-forks--orphans-and-reorgs-0c0c39d3c79b on May 21, 2019, 8 pages.

Wright C., "The Start of Metanet," webpage, Feb. 14, 2019, Retrieved from the Internet: https://medium.com/@craig_10243/the-start-of-metanet-ef0560e81505, 7 pages.

Combined Search and Examination Report for Great Britain Application No. GB1907339.4, dated Nov. 22, 2019, 8 pages.

Combined Search and Examination Report under Sections 17 and 18(3) for Application No. GB1907340.2 mailed on Nov. 22, 2019, 7 pages.

Combined Search and Examination Report under Sections 17 and 18(3) for Application No. GB1907343.6 mailed on Nov. 22, 2019, 6 pages.

Combined Search and Examination Report under Sections 17 and 18(3) for Application No. GB1907344.4 mailed on Nov. 25, 2019, 6 pages.

International Search Report and Written Opinion for International Application No. PCT/IB2020/053764 mailed Jul. 30, 2020, 13 pages.

International Search Report and Written Opinion for International Application No. PCT/IB2020/053765 mailed Jul. 24, 2020, 14 pages.

International Search Report and Written Opinion for International Application No. PCT/IB2020/053771 mailed Jul. 28, 2020, 15 pages.

International Search Report and Written Opinion for International Application No. PCT/IB2020/053815 mailed Jun. 22, 2020, 12 pages.

Pittl B., et al., "Bazaar-Blockchain: A Blockchain for Bazaar-Based Cloud Markets," 2018 IEEE International Conference on Services Computing (SCC), IEEE, Jul. 2, 2018, pp. 89-96.

Shi F., et al., "OPPay: Design and Implementation of A Payment System for Opportunistic Data Services", 2017 IEEE 37th International Conference on Distributed Computing Systems, Jun. 2017, pp. 1618-1628.

Fuchita Y., "Special Feature: Innovation and Finance - Blockchain and Financial Transaction Innovation," Nomura Capital Markets Quarterly, Japan, Nomura Institute of Capital Markets Research, Nov. 1, 2015, vol. 19, No. 2, 30Pages.

Office Action for Japanese Patent Application No. 2021-567834, mailed on May 14, 2024, 8 pages.

* cited by examiner

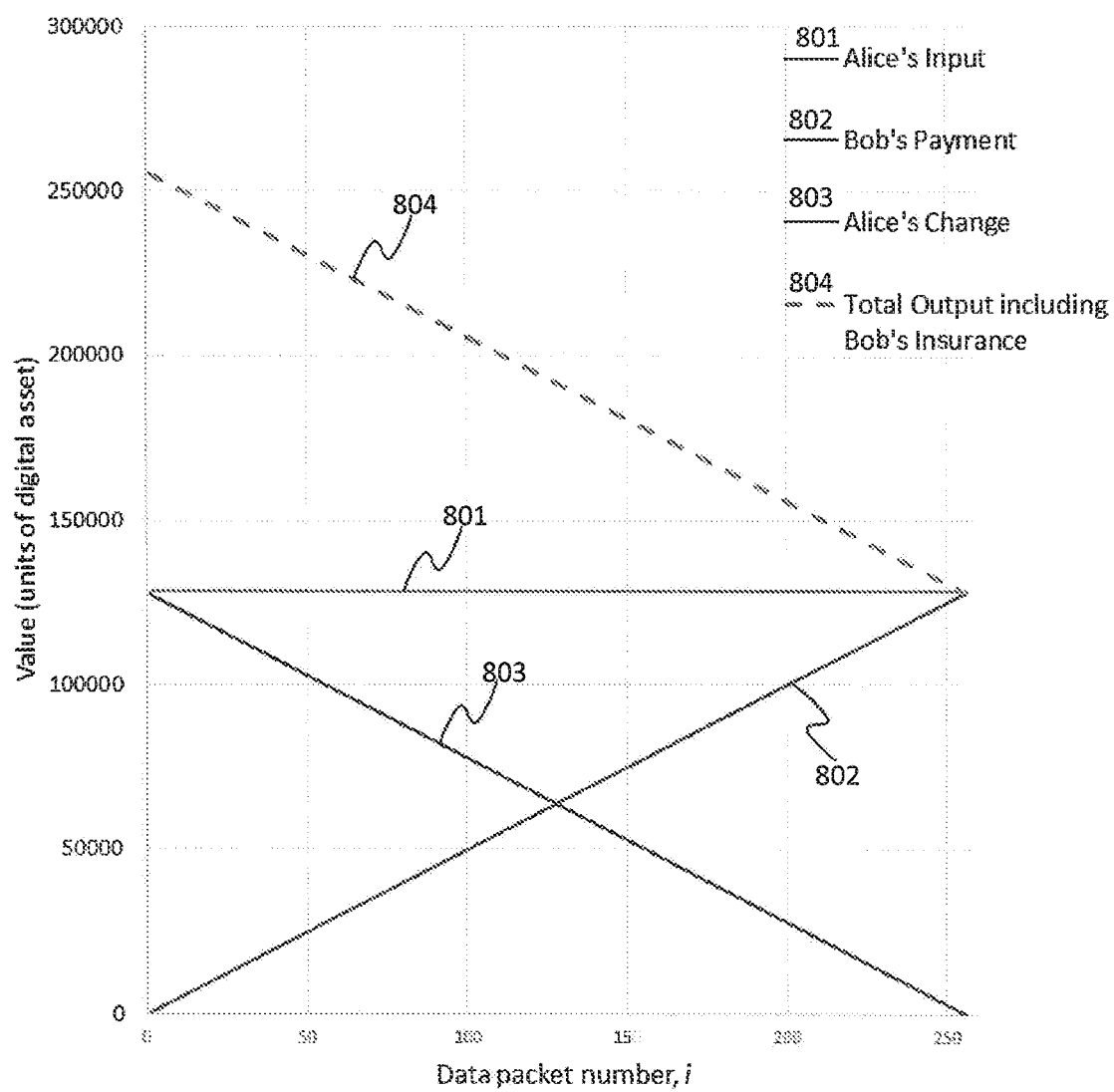

| | Inputs | | Outputs |
|---|---|---|---|
| | Unlocking script | | Locking script |
| $TxID_0$<br>$vout = 0$<br><br>130,500<br>units | $<Sig(P_A, Tx_1)>$<br><br>SIGHASH_ALL \| ANYONECANPAY<br><br>$<P_A>$ | 500 units | OP_DUP OP_SHA256 $<H(D_1)>$ OP_EQUAL<br>OP_IF<br>    OP_DROP OP_DUP OP_HASH160 $<H(P_B)>$<br>    OP_EQUALVERIFY OP_CHECKSIGVERIFY<br><br>OP_ELSE<br>    $<2> <H(P_A)> <H(P_B)> <2>$<br>    OP_CHECKMULTISIG<br>    OP_IF<br>        OP_VERIFY<br><br>    OP_ELSE<br>        $<720\ blocks>$<br>        OP_CHECKSEQUENCEVERIFY<br>        OP_DUP OP_HASH160 $<H(P_A)>$<br>        OP_EQUALVERIFY<br>        OP_CHECKSIGVERIFY<br><br>    OP_ENDIF<br><br>OP_ENDIF |
| | | 130,000 units | OP_DUP OP_HASH160 $<H(P_A)>$ OP_EQUALVERIFY<br>OP_CHECKSIG |
| | | 130,000 units | OP_DUP OP_HASH160 $<H(P_B)>$ OP_EQUALVERIFY<br>OP_CHECKSIG |

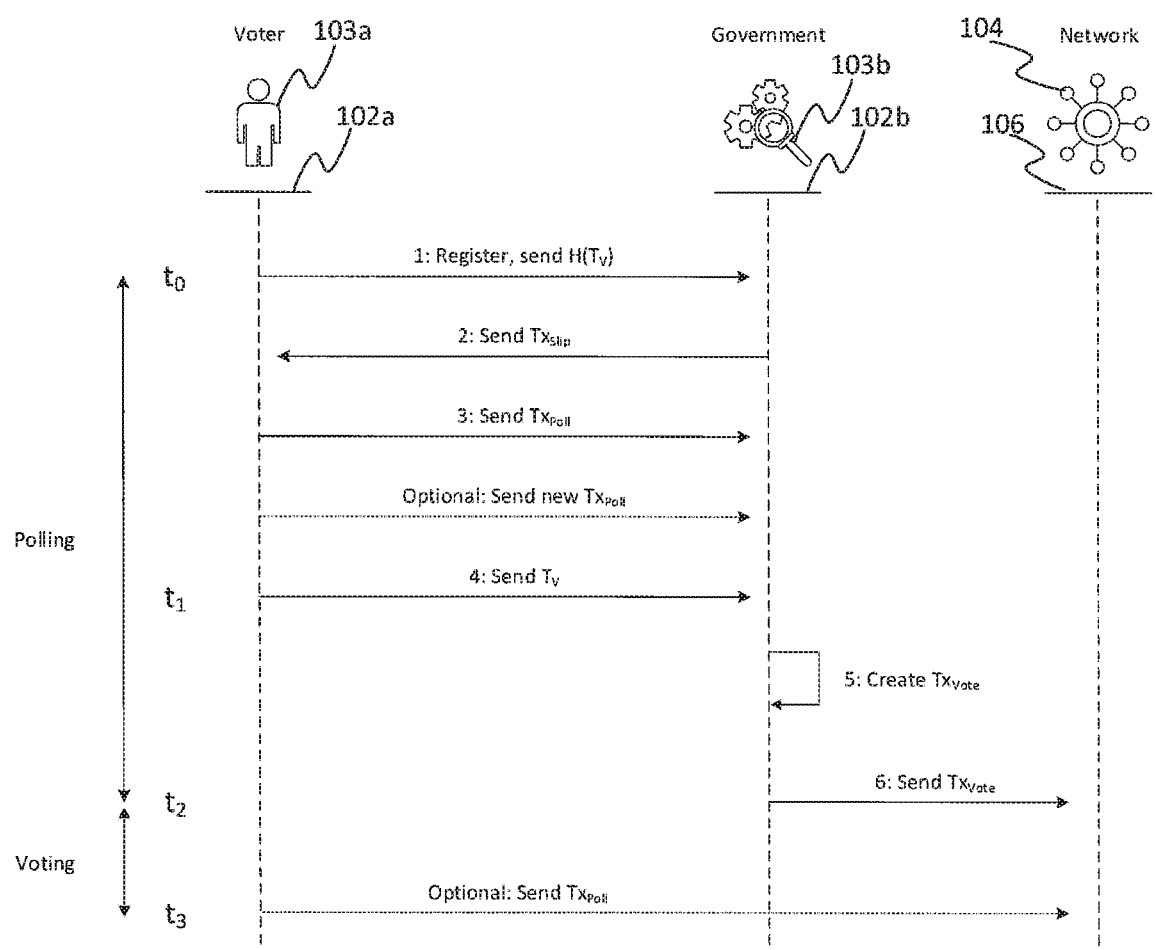

Figure 11

| $TxID_{Slip}$ | | | |
|---|---|---|---|
| Inputs | | Outputs | |
| | Unlocking script | | Locking script |
| $x$ BSV | $<Sig(P_{Gov}, Tx_{Slip})> <P_{Gov}>$ | $x$ BSV | $<t_2>$ OP_CHECKSEQUENCEVERIFY [Vote script] |

| $TxID_{Poll}$ | | | |
|---|---|---|---|
| Inputs | | Outputs | |
| | Unlocking script | | Locking script |
| $TxID_{Slip}$ $vout = 0$ $x$ BSV | $<Sig(P_{V,L}, Tx_{Poll})> <P_{V,L}> <$"Lab"$>$ OR $<Sig(P_{V,C}, Tx_{Poll})> <P_{V,C}> <$"Cons"$>$ | $x$ BSV | OP_DUP OP_HASH160 $<H(P_V)>$ OP_EQUALVERIFY OP_CHECKSIG |

| $TxID_{Vote}$ | | | |
|---|---|---|---|
| Inputs | | Outputs | |
| | Unlocking script | | Locking script |
| $TxID_{Slip}$ $vout = 0$ $x$ BSV | $<Sig(P_{Gov}, Tx_{Vote})> <P_{Gov}> <T_V>$ $<Sig(P_{V,L}, Tx_{Poll})> <P_{V,L}> <$"Lab"$>$ OR $<Sig(P_{Gov}, Tx_{Vote})> <P_{Gov}> <T_V>$ $<Sig(P_{V,C}, Tx_{Poll})> <P_{V,C}> <$"Cons"$>$ | $x$ BSV | OP_DUP OP_HASH160 $<H(P_V)>$ OP_EQUALVERIFY OP_CHECKSIG |

MALLEABILITY OF TRANSACTIONS FOR INCLUSION IN A BLOCKCHAIN

CROSS-REFERENCE TO RELATED APPLICATIONS

This application is a continuation of U.S. National Stage application Ser. No. 17/612,169 entitled "Malleability of Transactions for Inclusion in a Blockchain" and filed on Nov. 17, 2021, which is a National Stage of International Application No. PCT/1132020/053815 filed on Apr. 22, 2020, which claims the benefit of United Kingdom Patent Application No. 1907339.4, filed on May 24, 2019, the contents of which are incorporated herein by reference in their entireties.

TECHNICAL FIELD

The present disclosure relates to the phenomenon of malleability in the context of blockchain, i.e. the ability to change certain unsigned parts of the transaction without invalidating the transaction.

BACKGROUND

A blockchain refers to a form of distributed data structure, wherein a duplicate copy of the blockchain is maintained at each of a plurality of nodes in a peer-to-peer (P2P) network. The blockchain comprises a chain of blocks of data, wherein each block comprises one or more transactions. Each transaction may point back to a preceding transaction in a sequence. Transactions can be submitted to the network to be included in new blocks by a process known as "mining", which involves each of a plurality of mining nodes competing to perform "proof-of-work", i.e. solving a cryptographic puzzle based on a pool of the pending transactions waiting to be included in blocks.

Conventionally the transactions in the blockchain are used to convey a digital asset, i.e. data acting as a store of value. However, a blockchain can also be exploited in order to layer additional functionality on top of the blockchain. For instance, blockchain protocols may allow for storage of additional user data in an output of a transaction. Modern blockchains are increasing the maximum data capacity that can be stored within a single transaction, enabling more complex data to be incorporated. For instance this may be used to store an electronic document in the blockchain, or even audio or video data.

Each node in the network can have any one, two or all of three roles: forwarding, mining and storage. Forwarding nodes each propagate (valid) transactions to one or more other nodes, thus between them propagating the transactions throughout the nodes of the network. Mining nodes each compete to perform the mining of transactions into blocks. Storage nodes each store their own copy of the mined blocks of the blockchain. In order to have a transaction recorded in the blockchain, a party sends the transaction to one of the nodes of the network to be propagated. Mining nodes which receive the transaction may race to mine the transaction into a new block. Each node is configured to respect the same node protocol, which will include one or more conditions for a transaction to be valid. Invalid transactions will not be propagated nor mined into blocks. Assuming the transaction is validated and thereby accepted onto the blockchain, the additional user data will thus remain stored at each of the nodes in the P2P network as an immutable public record.

The miner who successfully solved the proof-of-work puzzle to create the latest block is typically rewarded with a transaction called a "generation transaction" generating a new amount of the digital asset. A transaction may optionally also specify an extra mining fee for the successful miner. The proof-of work incentivises miners not to cheat the system by including double-spending transactions in their blocks, since it requires a large amount of compute resource to mine a block, and a block that includes an attempt to double spend is likely not be accepted by other nodes.

In an "output-based" model (sometimes referred to as a UTXO-based model), the data structure of a given transaction comprises one or more inputs and one or more outputs. Any spendable output comprises an element specifying an amount of the digital asset, sometimes referred to as a UTXO ("unspent transaction output"). The output may further comprise a locking script specifying a condition for redeeming the output. Each input comprises a pointer to such an output in a preceding transaction, and may further comprise an unlocking script for unlocking the locking script of the pointed-to output. So consider a pair of transactions, call them a first and a second transaction (or "target" transaction). The first transaction comprises at least one output specifying an amount of the digital asset, and comprising a locking script defining one or more conditions of unlocking the output. The second, target transaction comprises at least one input, comprising a pointer to the output of the first transaction, and an unlocking script for unlocking the output of the first transaction.

In such a model, when the second, target transaction is sent to the P2P network to be propagated and recorded in the blockchain, one of the conditions for validity applied at each node will be that the unlocking script meets the requirement defined in the locking script of the first transaction. Another condition for the target transaction to be valid is that the output of the first transaction has not already been redeemed by another valid transaction. Any node that finds the target transaction invalid according to any of these conditions will not propagate it nor include it for mining into a block to be recorded in the blockchain.

Say that the target transaction is to convey an amount of digital asset from a first party ("Alice") to a second party ("Bob"). One of the requirements defined in the locking script of the preceding, first transaction is typically that the unlocking script of the target transaction contains a cryptographic signature of Alice. The signature has to be produced by Alice signing a part of the target transaction. Which part this is may be flexibly defined by the unlocking script, or may be an inherent feature of the node protocol, depending on the protocol being used. Nonetheless, the part to be signed typically excludes some other part of the target transaction, e.g. some or all of the unlocking script itself.

This creates the possibility of "malleability". I.e. before mining, the part of the target transaction which is not signed can be modified ("malleated") without invalidating the transaction. Malleability is a known concept in cryptography generally, where it is usually seen as a security concern whereby a message can be maliciously modified but still accepted as genuine. In the context of a blockchain, malleability is not necessarily a concern but is merely known as a curious artefact whereby a certain part of a transaction can be modified without invalidating it.

Recently a proposal has been made to deliberately exploit malleability in order to use a transaction as a carrier of media data. The data content can be included in the unlocking script of a transaction, and this transaction is then sent between parties over a side channel called a "payment channel". One of the parties then malleates the transaction to remove the data, and sends the malleated version onward to the P2P network to be mined (whereas if the data was not removed then the transaction would bloat the blockchain, and typically also require a higher mining fee, since the reward required by miners to accept a transaction typically scales with the data size of the transaction).

SUMMARY

The present disclosure recognizes a further way in which malleability, or more generally updateability, can be exploited as a positive feature. Particularly, it is also known that the first of a pair of transactions can include multiple different unlocking conditions in its locking script. Conventionally only one version of the target transaction would ever be created, to redeem the output of the first transaction based on one condition or the other. However, it is recognized herein that it would in fact be useful for there to exist two versions: a first version of the target transaction with an unlocking script redeeming the first transaction based on a first of the conditions, and a second version redeeming the first transaction based on a second of the conditions. The second, updated version could be created either by malleating the first version, or by creating a fresh version from scratch. They could exist in parallel or one after another. Both versions cannot validly redeem the first transaction, but the existence of the first version can act as a "back up" for Bob in case the necessary circumstances had not been met to meet the second condition.

According to one aspect disclosed herein, there is provided a method of recording a target transaction between a first and second party in a blockchain. The method comprises, by computer equipment of the first or second party: obtaining a second, updated version of the target transaction, being updated relative to a pre-existing first version of the target transaction; and instead of the first version, sending the updated version of the target transaction to be propagated through a network of nodes and recorded in a copy of the blockchain maintained at each of at least some of the nodes. The target transaction comprises an input comprising an unlocking script and a pointer to a first output of a first transaction, the first output comprising a locking script specifying a plurality of alternative conditions for unlocking the first output of the first transaction. The unlocking script of the first version of the target transaction is configured to unlock the first output of the first transaction based on meeting a first of said alternative conditions, and the unlocking script of the updated version is configured to unlock the first output of the first transaction based on meeting a second one of said alternative conditions instead of the first condition.

For each of a plurality of transactions including the target transaction, at least some nodes of the network are configured to propagate each transaction on condition of the transaction being valid and at least some nodes are configured to record each transaction in the copy of the blockchain at that node on condition of the transaction being valid, wherein the validity of the target transaction is conditional on the unlocking script unlocking the output of the first transaction according to any one of said conditions, but once one of the versions is validated at any given node then the other version would be deemed invalid at that node.

Hence the second party ("Bob") does not send both versions to be propagated and recorded in the blockchain, as both versions cannot validly redeem the first transaction. He sends the second version to be propagated and recorded, which is his preference, but the fact that the first versions existed gave him the fall-back to have had the first version recorded if the necessary circumstances for the second version had not been met.

For instance, in a first example use case, the first transaction ("$Tx_1$") includes a payment from the first party ("Alice") for a service to be provided by a second party ("Bob"). The first transaction could be created by Alice, Bob or a third party. It could be on the chain already or sent to be recorded there later. Either way, the locking script in an output of the first transaction specifies at least two alternative conditions for unlocking the payment defined in that output, a first condition and a second condition. The first condition does not require a signature of Alice to be included in the unlocking script of the target transaction, but places some other onerous requirement on Bob, such as requiring that the unlocking script includes a large predefined piece of data (which would incur a high mining fee) or a piece of sensitive or private data of Bob's (which Bob would prefer not to publish on the blockchain). The second condition does require Alice's signature to be included in the unlocking script of the target transaction, but does not impose the onerous requirement of the first condition.

Alice also provides Bob with the first version of the target transaction ("$Tx_p$"), or Bob creates it himself (or it is created by a third party). The first version is configured to unlock the output of the first transaction $Tx_1$ based on the first condition, whereas the second version ("$Tx_p'$") will be configured to unlock it based on the second condition. Bob then provides the service. If Alice is content and honest, then in response she provides Bob with the second version of the target transaction $Tx_p'$ including her signature (or at least provides her signature for Bob or a third party to assemble into the second version). However, had Alice reneged on the agreement, Bob would still have had the option to send the pre-existing, less preferred first version $Tx_p$ in order to redeem the output of the first transaction $Tx_1$ based on the less-preferred first condition.

In a second example use case, the method may comprise, by the computer equipment of the second party: streaming a sequence of data portions to the first party, ending with a final portion in the sequence; and in response to each respective one of the data portions, receiving back a respective instance of the first transaction from the first party, the first output of each instance specifying a payment to the second party for the respective portion; wherein the payment increases with each data portion (e.g. the increase may be linear in proportion to the number of data portions sent so far). In such embodiments, said obtaining of the updated version of the target transaction comprises receiving the updated version from the first party following the final portion in the sequence.

For instance, each data portion may be a different portion of an item of media content (e.g. audio and/or video content). Alternatively each data portion is a different key for accessing a unit of a service (e.g. a utility such as gas, water or electricity; or rental of a vehicle, real estate or other physical object).

The instances of the first transaction ($Tx_1$, $Tx_2$, $Tx_3$, . . . ) would be recognized by each node of the network as instances of substantially the same transaction, e.g. because the first output has the same output identifier (e.g. UTXO identifier) in each instance. Hence only one instance can be recorded in the blockchain. Once one instance is accepted as valid by any given node, then any attempt to record a further version would be deemed invalid and hence rejected by that node. Further, once one of the instances of the first transaction is found at any given node to be validly redeemed by one of the versions of the target transaction ($Tx_p$ or $Tx_p'$), then any further target transaction attempting to redeem any instances of the first transaction would be deemed invalid by that node, and hence not propagated nor recorded in the blockchain by that node.

Since any version of the target transaction ($Tx_p$ or $Tx_p'$) will point to a same output ID of an instance of substantially the same first transaction (just defining different amounts), then only one target transaction can validly redeem that output. Once one of the instances of the first transaction ($Tx_1$, $Tx_2$, $Tx_3$, ... ) is found to be validly redeemed by one of the versions of the target transaction ($Tx_p$ or $Tx_p'$) at any given node, then any further target transaction attempting to redeem any instances of the first transaction would be deemed invalid, and hence not propagated nor recorded in the blockchain by that node. Nonetheless, since the payment in each instance also increases in exchange for each portion of data, all the second party ("Bob") has to do is send off a version of the target transaction $Tx_p'$ redeeming the last or most recent instance of the first transaction $Tx_n$ to be propagated and recorded in the blockchain. He will then receive the full payment for all portions of data sent up to that point based on a single pair of transactions. If instead the first party ("Alice") sent a separate individual payment for each individual portion of data, this would bloat the blockchain and lead to more network traffic since Bob would have to send off a separate transaction for each potion of data (e.g. each packet or chunk of the audio or video content).

If at any point Alice had stopped sending instances of the first transaction ($Tx_1$, $Tx_2$, $Tx_3$, ... ) before the end of the sequence, Bob would have still had the option to stop sending further data portions to Alice, and to send off the first version of the target transaction $Tx_p$ to the network in order to redeem payment for the portions of data sent prior to that point (so losing out for only the latest data portion sent). Conversely, if at any point Bob had stopped sending data portions, Alice would have had the option to stop sending further instances of the first transaction $Tx_1$, and Bob would have only received the ability to redeem payment for the data portions received by Alice so far.

In a particular optional implementation, the first transaction may comprise one or more first inputs specifying an input amount, the first output of the first transaction may specify a first payment, and the first transaction may further comprises one or more further outputs specifying one or more further payments such that the total of the payments is greater than the input amount, wherein the first transaction as received by the second party from the first party may comprise no other inputs to make up the difference. The nodes of the network will reject the first transaction as invalid if it specifies a total payment greater than a total input amount. In such embodiments, the method comprises the second party adding a second input to the final or most recent instance of the first transaction to make up the difference, and sending the first transaction with the second input added to be propagated though the network and recorded in the blockchain.

As an example implementation of this, the further outputs comprise a second output specifying a second payment to the first party equal to the input amount minus the first payment, and a third output specifying a third payment to the second party equal to the second payment.

such embodiments prevent the first party ("Alice") from cheating the system by sending off her own target transaction to redeem one of the earlier instances and thus preventing Bob from redeeming one of the later instances (or indeed any of the instances), since to do so Alice would have to add extra inputs which would incur more of her digital asset. Hence it is not worth Alice attempting to cheat the system.

In another example use case, each of at least some of the alternative conditions may correspond to different choices for a vote; and the method may comprise, prior to the obtaining of the updated version of the target transaction: accessing, or making available to be accessed by a third party, the unlocking script in the first version as a non-binding indication of voting intention. If the polling indication was never actually converted into a vote, the first version could remain as a public indication of how the poll differed from the eventual voting results.

According to further aspects disclosed herein, there are provided a program for performing the method, and/or computer equipment of the second party programmed to perform the method. The program or computer equipment may be configured to enable the second party to selectively send either the first or second version to be propagated though the network and recorded in the blockchain, either by providing a manual option to select either version, and/or an automated function configured to automatically send the first version upon a first event and further configured to automatically send the second version to be propagated and recorded instead of the second version upon a second event.

BRIEF DESCRIPTION OF THE DRAWINGS

To assist understanding of embodiments of the present disclosure and to show how such embodiments may be put into effect, reference is made, by way of example only, to the accompanying drawings in which:

FIG. 8 is a graph showing values of inputs and outputs of instances of the first transaction in an example implementation of the method of FIG. 7, FIG. 9 is an example transaction format for the first transaction in the method of FIG. 7, FIG. 10 is a signalling chart showing a voting method, and FIG. 11 shows an example set of transactions for implementing the method of FIG. 10.

DETAILED DESCRIPTION OF EMBODIMENTS

Malleability is an existing concept in cryptography that underpins the security concern whereby a message can be maliciously modified but still accepted as genuine. Digital signature schemes are designed to address this concern. In a blockchain, however, malleability refers to the ability to modify at least part of a transaction without invalidating the transaction as a whole. Any information in the transaction that is signed by the relevant form of cryptographic signature (e.g. an ECDSA signature) is not subject to the possibility of malleation. Any security concern related to malleability is instead caused by inappropriate implementation rather than the protocol itself.

The following will explore malleability as a useful feature to facilitate fast, secure, and trustless payment channels. The idea is to identify which part or parts in a transaction that are not, or do not have to be, signed (e.g. by an ECDSA signature). The disclosed scheme will make use of the fact that any content in the unlocking script (e.g. 'scriptSig' field) of each input of the transaction is not signed by any signature. Embodiments may also make use of SIGHASH flags to allow more flexibility to modify the transaction without invalidating it.

An example is as follows. When exchanging data on the blockchain, one common practice is to use hash puzzle to force that revealing the data and accepting the payment happens simultaneously. To avoid this, a transaction can be constructed such that the payment can be claimed on either of two conditions: i) providing "data+Bob's signature"; or ii) providing "Alice's signature+Bob's signature".

Bob will construct a transaction to claim the fund by providing the data and his signature and send it to Alice. Alice then replaces the data with her signature and broadcasts the transaction to the network. Alternatively Bob obtains Alice's signature, replaces the data with it, and broadcasts to the network. Either way, as the data is not part of the message signed by Bob's signature, replacing it with Alice's signature will not invalidate the transaction. Moreover, the transaction is still valid as the input satisfies condition ii). In case that Alice does not broadcast the transaction to the network or provide her signature, Bob still has the option to broadcast the original transaction to claim the fund based on condition i) (which is less preferred since he has to upload the data, which could be sizeable and/or proprietary). Alice may be encouraged to provide her signature by a requirement to acknowledge, an incentive of a discount, or to reward Bob for a service well performed.

System Overview

Figure 1:
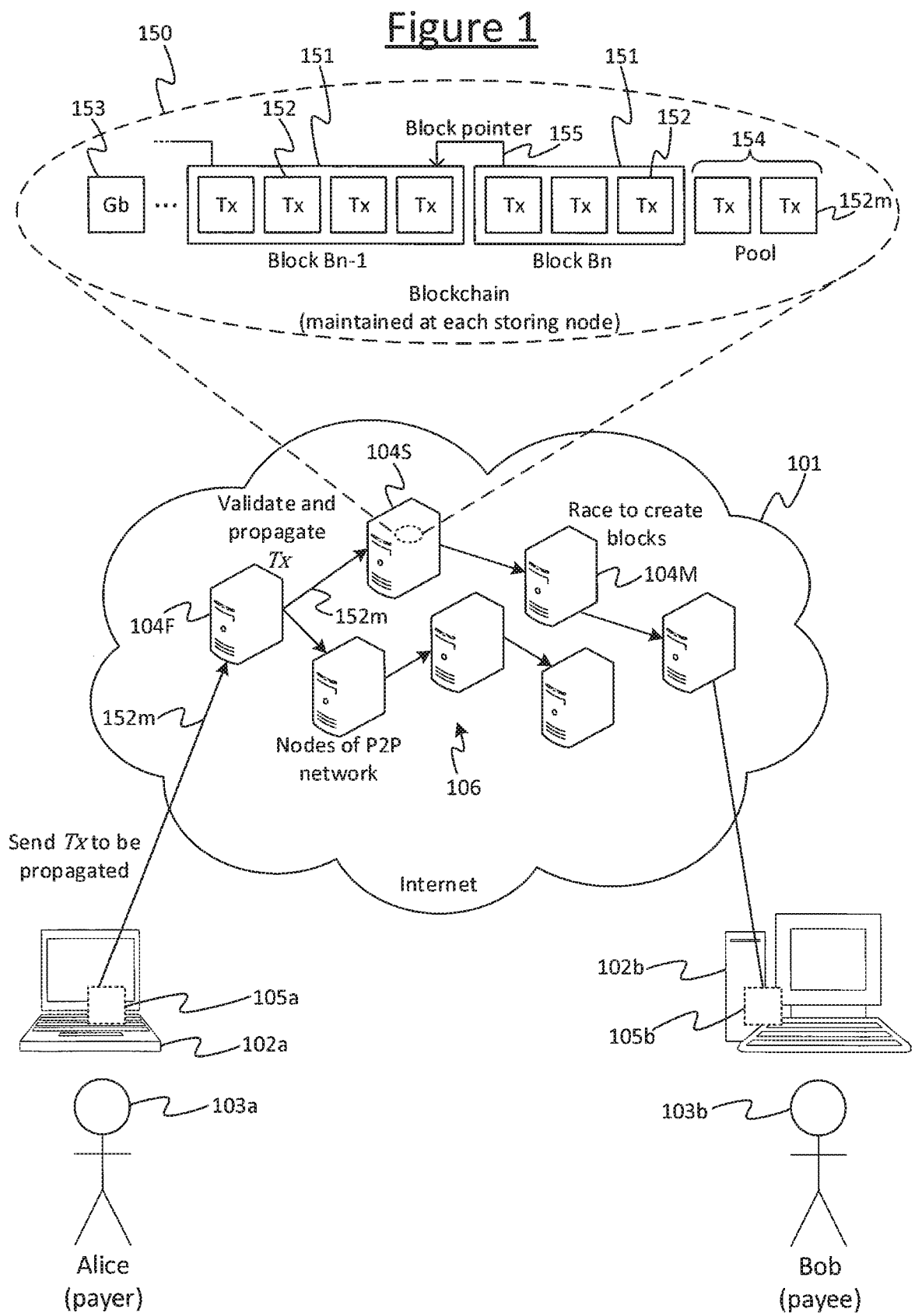
FIG. 1 is a schematic block diagram of a system for implementing a blockchain.

FIG. 1 shows an example system 100 for implementing a blockchain 150. The system 100 comprises a packet-switched network 101, typically a wide-area internetwork such as the Internet. The packet-switched network 101 comprises a plurality of nodes 104 arranged to form a peer-to-peer (P2P) overlay network 106 within the packet-switched network 101. Each node 104 comprises computer equipment of a peers, with different ones of the nodes 104 belonging to different peers. Each node 104 comprises processing apparatus comprising one or more processors, e.g. one or more central processing units (CPUs), accelerator processors, application specific processors and/or field programmable gate arrays (FPGAs). Each node also comprises memory, i.e. computer-readable storage in the form of a non-transitory computer-readable medium or media. The memory may comprise one or more memory units employing one or more memory media, e.g. a magnetic medium such as a hard disk; an electronic medium such as a solid-state drive (SSD), flash memory or EEPROM; and/or an optical medium such as an optical disk drive.

The blockchain 150 comprises a chain of blocks of data 151, wherein a respective copy of the blockchain 150 is maintained at each of a plurality of nodes in the P2P network 160. Each block 151 in the chain comprises one or more transactions 152, wherein a transaction in this context refers to a kind of data structure. The nature of the data structure will depend on the type of transaction protocol used as part of a transaction model or scheme. A given blockchain will typically use one particular transaction protocol throughout.

In one common type of transaction protocol, the data structure of each transaction 152 comprises at least one input and at least one output. Each output specifies an amount representing a quantity of a digital asset belonging to a user 103 to whom the output is cryptographically locked (requiring a signature of that user in order to be unlocked and thereby redeemed or spent). Each input points back to the output of a preceding transaction 152, thereby linking the transactions.

At least some of the nodes 104 take on the role of forwarding nodes 104F which forward and thereby propagate transactions 152. At least some of the nodes 104 take on the role of miners 104M which mine blocks 151. At least some of the nodes 104 take on the role of storage nodes 104S (sometimes also called "full-copy" nodes), each of which stores a respective copy of the same blockchain 150 in their respective memory. Each miner node 104M also maintains a pool 154 of transactions 152 waiting to be mined into blocks 151. A given node 104 may be a forwarding node 104, miner 104M, storage node 104S or any combination of two or all of these.

In a given present transaction 152j, the (or each) input comprises a pointer referencing the output of a preceding transaction 152i in the sequence of transactions, specifying that this output is to be redeemed or "spent" in the present transaction 152j. In general, the preceding transaction could be any transaction in the pool 154 or any block 151. The preceding transaction 152i need not necessarily exist at the time the present transaction 152j is created or even sent to the network 106, though the preceding transaction 152i will need to exist and be validated in order for the present transaction to be valid. Hence "preceding" herein refers to a predecessor in a logical sequence linked by pointers, not necessarily the time of creation or sending in a temporal sequence, and hence it does not necessarily exclude that the transactions 152i, 152j be created or sent out-of-order (see discussion below on orphan transactions). The preceding transaction 152i could equally be called the antecedent or predecessor transaction.

The input of the present transaction 152j also comprises the signature of the user 103a to whom the output of the preceding transaction 152i is locked. In turn, the output of the present transaction 152j can be cryptographically locked to a new user 103b. The present transaction 152j can thus transfer the amount defined in the input of the preceding transaction 152i to the new user 103b as defined in the output of the present transaction 152j. In some cases a transaction 152 may have multiple outputs to split the input amount between multiple users (one of whom could be the original user 103a in order to give change). In some cases transaction can also have multiple inputs to gather together the amounts from multiple outputs of one or more preceding transactions, and redistribute to one or more outputs of the current transaction.

The above may be referred to as an "output-based" transaction protocol, sometimes also referred to as an unspent transaction output (UTXO) type protocol (where the outputs are referred to as UTXOs). A user's total balance is not defined in any one number stored in the blockchain, and instead the user needs a special "wallet" application 105 to collate the values of all the UTXOs of that user which are scattered throughout many different transactions 152 in the blockchain 151.

An alternative type of transaction protocol may be referred to as an "account-based" protocol, as part of an account-based transaction model. In the account-based case, each transaction does not define the amount to be transferred by referring back to the UTXO of a preceding transaction in a sequence of past transactions, but rather by reference to an absolute account balance. The current state of all accounts is stored by the miners separate to the blockchain and is updated constantly. The present disclosure relates to an output-based model rather than account-based.

With either type of transaction protocol, when a user 103 wishes to enact a new transaction 152*j*, then he/she sends the new transaction from his/her computer terminal 102 to one of the nodes 104 of the P2P network 106 (which nowadays are typically servers or data centres, but could in principle be other user terminals). This node 104 checks whether the transaction is valid according to a node protocol which is applied at each of the nodes 104. The details of the node protocol will correspond to the type of transaction protocol being used in the blockchain 150 in question, together forming the overall transaction model. The node protocol typically requires the node 104 to check that the cryptographic signature in the new transaction 152*j* matches the expected signature, which depends on the previous transaction 152*i* in an ordered sequence of transactions 152. In an output-based case, this may comprise checking that the cryptographic signature of the user included in the input of the new transaction 152*j* matches a condition defined in the output of the preceding transaction 152*i* which the new transaction spends, wherein this condition typically comprises at least checking that the cryptographic signature in the input of the new transaction 152*j* unlocks the output of the previous transaction 152*i* to which the input of the new transaction points. In some transaction protocols the condition may be at least partially defined by a custom script included in the input and/or output. Alternatively it could simply be a fixed by the node protocol alone, or it could be due to a combination of these. Either way, if the new transaction 152*j* is valid, the current node forwards it to one or more others of the nodes 104 in the P2P network 106. At least some of these nodes 104 also act as forwarding nodes 104F, applying the same test according to the same node protocol, and so forward the new transaction 152*j* on to one or more further nodes 104, and so forth. In this way the new transaction is propagated throughout the network of nodes 104.

In an output-based model, the definition of whether a given output (e.g. UTXO) is spent is whether it has yet been validly redeemed by the input of another, onward transaction 152*j* according to the node protocol. Another condition for a transaction to be valid is that the output of the preceding transaction 152*i* which it attempts to spend or redeem has not already been spent/redeemed by another valid transaction. Again if not valid, the transaction 152*j* will not be propagated or recorded in the blockchain. This guards against double-spending whereby the spender tries to spend the output of the same transaction more than once.

In addition to validation, at least some of the nodes 104M also race to be the first to create blocks of transactions in a process known as mining, which is underpinned by "proof of work". At a mining node 104M, new transactions are added to a pool of valid transactions that have not yet appeared in a block. The miners then race to assemble a new valid block 151 of transactions 152 from the pool of transactions 154 by attempting to solve a cryptographic puzzle. Typically this comprises searching for a "nonce" value such that when the nonce is concatenated with the pool of transactions 154 and hashed, then the output of the hash meets a predetermined condition. E.g. the predetermined condition may be that the output of the hash has a certain predefined number of leading zeros. A property of a hash function is that it has an unpredictable output with respect to its input. Therefore this search can only be performed by brute force, thus consuming a substantive amount of processing resource at each node 104M that is trying to solve the puzzle.

The first miner node 104M to solve the puzzle announces this to the network 106, providing the solution as proof which can then be easily checked by the other nodes 104 in the network (once given the solution to a hash it is straightforward to check that it causes the output of the hash to meet the condition). The pool of transactions 154 for which the winner solved the puzzle then becomes recorded as a new block 151 in the blockchain 150 by at least some of the nodes 104 acting as storage nodes 104S, based on having checked the winner's announced solution at each such node. A block pointer 155 is also assigned to the new block 151*n* pointing back to the previously created block 151*n*-1 in the chain. The proof-of-work helps reduce the risk of double spending since it takes a large amount of effort to create a new block 151, and as any block containing a double spend is likely to be rejected by other nodes 104, mining nodes 104M are incentivised not to allow double spends to be included in their blocks. Once created, the block 151 cannot be modified since it is recognized and maintained at each of the storing nodes 104S in the P2P network 106 according to the same protocol. The block pointer 155 also imposes a sequential order to the blocks 151. Since the transactions 152 are recorded in the ordered blocks at each storage node 104S in a P2P network 106, this therefore provides an immutable public ledger of the transactions.

Note that different miners 104M racing to solve the puzzle at any given time may be doing so based on different snapshots of the unmined transaction pool 154 at any given time, depending on when they started searching for a solution. Whoever solves their respective puzzle first defines which transactions 152 are included in the next new block 151*n*, and the current pool 154 of unmined transactions is updated. The miners 104M then continue to race to create a block from the newly defined outstanding pool 154, and so forth. A protocol also exists for resolving any "fork" that may arise, which is where two miners 104M solve their puzzle within a very short time of one another such that a conflicting view of the blockchain gets propagated. In short, whichever prong of the fork grows the longest becomes the definitive blockchain 150.

In most blockchains the winning miner 104M is automatically rewarded with a special kind of new transaction which creates a new quantity of the digital asset out of nowhere (as opposed to normal transactions which transfer an amount of the digital asset from one user to another). Hence the winning node is said to have "mined" a quantity of the digital asset. This special type of transaction is sometime referred to as a "generation" transaction. It automatically forms part of the new block 151*n*. This reward gives an incentive for the miners 104M to participate in the proof-of-work race. Often a regular (non-generation) transaction 152 will also specify an additional transaction fee in one of its outputs, to further reward the winning miner 104M that created the block 151*n* in which that transaction was included.

Due to the computational resource involved in mining, typically at least each of the miner nodes 104M takes the form of a server comprising one or more physical server units, or even whole a data centre. Each forwarding node 104M and/or storage node 104S may also take the form of a server or data centre. However in principle any given node 104 could take the form of a user terminal or a group of user terminals networked together.

The memory of each node 104 stores software configured to run on the processing apparatus of the node 104 in order to perform its respective role or roles and handle transactions 152 in accordance with the node protocol. It will be understood that any action attributed herein to a node 104 may be performed by the software run on the processing apparatus of the respective computer equipment. Also, the term "blockchain" as used herein is a generic term that refers to the kind of technology in general, and does not limit to any particular proprietary blockchain, protocol or service.

Also connected to the network 101 is the computer equipment 102 of each of a plurality of parties 103 in the role of consuming users. These act as payers and payees in transactions but do not necessarily participate in mining or propagating transactions on behalf of other parties. They do not necessarily run the mining protocol. Two parties 103 and their respective equipment 102 are shown for illustrative purposes: a first party 103a and his/her respective computer equipment 102a, and a second party 103b and his/her respective computer equipment 102b. It will be understood that many more such parties 103 and their respective computer equipment 102 may be present and participating in the system, but for convenience they are not illustrated. Each party 103 may be an individual or an organization. Purely by way of illustration the first party 103a is referred to herein as Alice and the second party 103b is referred to as Bob, but it will be appreciated that this is not limiting and any reference herein to Alice or Bob may be replaced with "first party" and "second "party" respectively.

The computer equipment 102 of each party 103 comprises respective processing apparatus comprising one or more processors, e.g. one or more CPUs, GPUs, other accelerator processors, application specific processors, and/or FPGAs. The computer equipment 102 of each party 103 further comprises memory, i.e. computer-readable storage in the form of a non-transitory computer-readable medium or media. This memory may comprise one or more memory units employing one or more memory media, e.g. a magnetic medium such as hard disk; an electronic medium such as an SSD, flash memory or EEPROM; and/or an optical medium such as an optical disc drive. The memory on the computer equipment 102 of each party 103 stores software comprising a respective instance of at least one client application 105 arranged to run on the processing apparatus. It will be understood that any action attributed herein to a given party 103 may be performed using the software run on the processing apparatus of the respective computer equipment 102. The computer equipment 102 of each party 103 comprises at least one user terminal, e.g. a desktop or laptop computer, a tablet, a smartphone, or a wearable device such as a smartwatch. The computer equipment 102 of a given party 103 may also comprise one or more other networked resources, such as cloud computing resources accessed via the user terminal.

The client application or software 105 may be initially provided to the computer equipment 102 of any given party 103 on suitable computer-readable storage medium or media, e.g. downloaded from a server, or provided on a removable storage device such as a removable SSD, flash memory key, removable EEPROM, removable magnetic disk drive, magnetic floppy disk or tape, optical disk such as a CD or DVD ROM, or a removable optical drive, etc.

The client application 105 comprises at least a "wallet" function. This has two main functionalities. One of these is to enable the respective user party 103 to create, sign and send transactions 152 to be propagated throughout the network of nodes 104 and thereby included in the blockchain 150. The other is to report back to the respective party the amount of the digital asset that he or she currently owns. In an output-based system, this second functionality comprises collating the amounts defined in the outputs of the various 152 transactions scattered throughout the blockchain 150 that belong to the party in question.

The instance of the client application 105 on each computer equipment 102 is operatively coupled to at least one of the forwarding nodes 104F of the P2P network 106. This enables the wallet function of the client 105 to send transactions 152 to the network 106. The client 105 is also able to contact one, some or all of the storage nodes 104 in order to query the blockchain 150 for any transactions of which the respective party 103 is the recipient (or indeed inspect other parties' transactions in the blockchain 150, since in embodiments the blockchain 150 is a public facility which provides trust in transactions in part through its public visibility). The wallet function on each computer equipment 102 is configured to formulate and send transactions 152 according to a transaction protocol. Each node 104 runs software configured to validate transactions 152 according to a node protocol, and in the case of the forwarding nodes 104F to forward transactions 152 in order to propagate them throughout the network 106. The transaction protocol and node protocol correspond to one another, and a given transaction protocol goes with a given node protocol, together implementing a given transaction model. The same transaction protocol is used for all transactions 152 in the blockchain 150 (though the transaction protocol may allow different subtypes of transaction within it). The same node protocol is used by all the nodes 104 in the network 106 (though it many handle different subtypes of transaction differently in accordance with the rules defined for that subtype, and also different nodes may take on different roles and hence implement different corresponding aspects of the protocol).

As mentioned, the blockchain 150 comprises a chain of blocks 151, wherein each block 151 comprises a set of one or more transactions 152 that have been created by a proof-of-work process as discussed previously. Each block 151 also comprises a block pointer 155 pointing back to the previously created block 151 in the chain so as to define a sequential order to the blocks 151. The blockchain 150 also comprises a pool of valid transactions 154 waiting to be included in a new block by the proof-of-work process. Each transaction 152 comprises a pointer back to a previous transaction so as to define an order to sequences of transactions (N.B. sequences of transactions 152 are allowed to branch). The chain of blocks 151 goes all the way back to a genesis block (Gb) 153 which was the first block in the chain. One or more original transactions 152 early on in the chain 150 pointed to the genesis block 153 rather than a preceding transaction.

When a given party 103, say Alice, wishes to send a new transaction 152j to be included in the blockchain 150, then she formulates the new transaction in accordance with the relevant transaction protocol (using the wallet function in her client application 105). She then sends the transaction 152 from the client application 105 to one of the one or more forwarding nodes 104F to which she is connected. E.g. this could be the forwarding node 104F that is nearest or best connected to Alice's computer 102. When any given node 104 receives a new transaction 152j, it handles it in accordance with the node protocol and its respective role. This comprises first checking whether the newly received transaction 152j meets a certain condition for being "valid", examples of which will be discussed in more detail shortly.

In some transaction protocols, the condition for validation may be configurable on a per-transaction basis by scripts included in the transactions 152. Alternatively the condition could simply be a built-in feature of the node protocol, or be defined by a combination of the script and the node protocol.

On condition that the newly received transaction 152j passes the test for being deemed valid (i.e. on condition that it is "validated"), any storage node 104S that receives the transaction 152j will add the new validated transaction 152 to the pool 154 in the copy of the blockchain 150 maintained at that node 104S. Further, any forwarding node 104F that receives the transaction 152j will propagate the validated transaction 152 onward to one or more other nodes 104 in the P2P network 106. Since each forwarding node 104F applies the same protocol, then assuming the transaction 152j is valid, this means it will soon be propagated throughout the whole P2P network 106.

Once admitted to the pool 154 in the copy of the blockchain 150 maintained at one or more storage nodes 104, then miner nodes 104M will start competing to solve the proof-of-work puzzle on the latest version of the pool 154 including the new transaction 152 (other miners 104M may still be trying to solve the puzzle based on the old view of the pool 154, but whoever gets there first will define where the next new block 151 ends and the new pool 154 starts, and eventually someone will solve the puzzle for a part of the pool 154 which includes Alice's transaction 152j). Once the proof-of-work has been done for the pool 154 including the new transaction 152j, it immutably becomes part of one of the blocks 151 in the blockchain 150. Each transaction 152 comprises a pointer back to an earlier transaction, so the order of the transactions is also immutably recorded.

Figure 2:
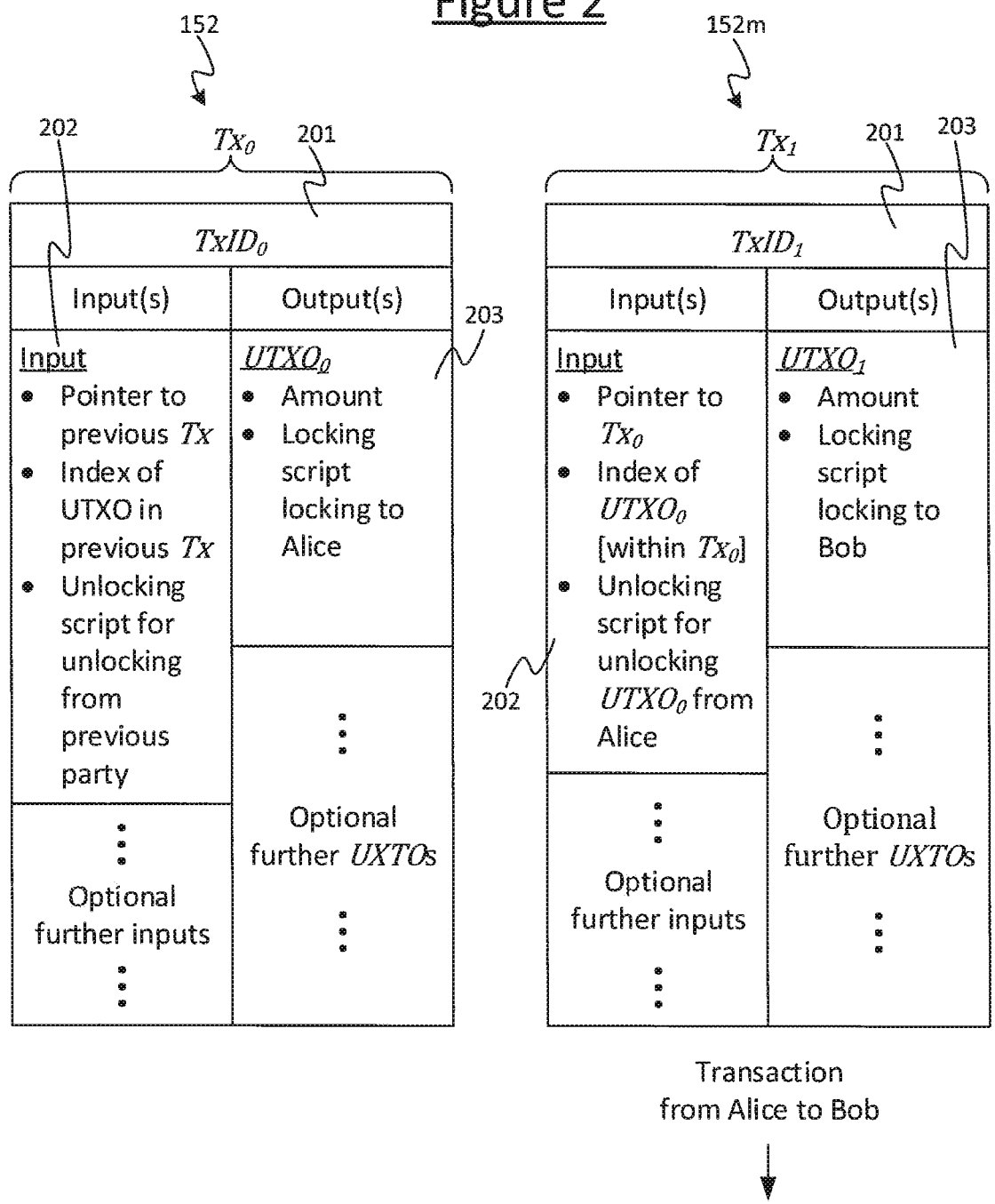
FIG. 2 schematically illustrates some examples of transactions which may be recorded in a blockchain.

FIG. 2 illustrates an example transaction protocol. This is an example of an UTXO-based protocol. A transaction 152 (abbreviated "Tx") is the fundamental data structure of the blockchain 150 (each block 151 comprising one or more transactions 152). The following will be described by reference to an output-based or "UTXO" based protocol. However, this not limiting to all possible embodiments.

In a UTXO-based model, each transaction ("TY") 152 comprises a data structure comprising one or more inputs 202, and one or more outputs 203. Each output 203 may comprise an unspent transaction output (UTXO), which can be used as the source for the input 202 of another new transaction (if the UTXO has not already been redeemed). The UTXO specifies an amount of a digital asset (a store of value). It may also contain the transaction ID of the transaction from which it came, amongst other information. The transaction data structure may also comprise a header 201, which may comprise an indicator of the size of the input field(s) 202 and output field(s) 203. The header 201 may also include an ID of the transaction. In embodiments the transaction ID is the hash of the transaction data (excluding the transaction ID itself) and stored in the header 201 of the raw transaction 152 submitted to the miners 104M.

Say Alice 103a wishes to create a transaction 152j transferring an amount of the digital asset in question to Bob 103b. In FIG. 2 Alice's new transaction 152j is labelled "$Tx_1$". It takes an amount of the digital asset that is locked to Alice in the output 203 of a preceding transaction 152i in the sequence, and transfers at least some of this to Bob. The preceding transaction 152i is labelled "$Tx_0$" in FIG. 2. $Tx_0$ and $Tx_1$ are just an arbitrary labels. They do not necessarily mean that $Tx_0$ is the first transaction in the blockchain 151, nor that $Tx_1$ is the immediate next transaction in the pool 154. $Tx_1$ could point back to any preceding (i.e. antecedent) transaction that still has an unspent output 203 locked to Alice.

The preceding transaction $Tx_0$ may already have been validated and included in the blockchain 150 at the time when Alice creates her new transaction $Tx_1$, or at least by the time she sends it to the network 106. It may already have been included in one of the blocks 151 at that time, or it may be still waiting in the pool 154 in which case it will soon be included in a new block 151. Alternatively $Tx_0$ and $Tx_1$ could be created and sent to the network 102 together, or $Tx_0$ could even be sent after $Tx_1$ if the node protocol allows for buffering "orphan" transactions. The terms "preceding" and "subsequent" as used herein in the context of the sequence of transactions refer to the order of the transactions in the sequence as defined by the transaction pointers specified in the transactions (which transaction points back to which other transaction, and so forth). They could equally be replaced with "predecessor" and "successor", or "antecedent" and "descendant", "parent" and "child", or such like. It does not necessarily imply an order in which they are created, sent to the network 106, or arrive at any given node 104. Nevertheless, a subsequent transaction (the descendent transaction or "child") which points to a preceding transaction (the antecedent transaction or "parent") will not be validated until and unless the parent transaction is validated. A child that arrives at a node 104 before its parent is considered an orphan. It may be discarded or buffered for a certain time to wait for the parent, depending on the node protocol and/or miner behaviour.

One of the one or more outputs 203 of the preceding transaction $Tx_0$ comprises a particular UTXO, labelled here $UTXO_0$. Each UTXO comprises a value specifying an amount of the digital asset represented by the UTXO, and a locking script which defines a condition which must be met by an unlocking script in the input 202 of a subsequent transaction in order for the subsequent transaction to be validated, and therefore for the UTXO to be successfully redeemed. Typically the locking script locks the amount to a particular party (the beneficiary of the transaction in which it is included). I.e. the locking script defines an unlocking condition, typically comprising a condition that the unlocking script in the input of the subsequent transaction comprises the cryptographic signature of the party to whom the preceding transaction is locked.

The locking script (aka scriptPubKey) is a piece of code written in the domain specific language recognized by the node protocol. A particular example of such a language is called "Script" (capital S). The locking script specifies what information is required to spend a transaction output 203, for example the requirement of Alice's signature. Unlocking scripts appear in the outputs of transactions. The unlocking script (aka scriptSig) is a piece of code written the domain specific language that provides the information required to satisfy the locking script criteria. For example, it may contain Bob's signature. Unlocking scripts appear in the input 202 of transactions.

So in the example illustrated, $UTXO_0$ in the output 203 of $Tx_0$ comprises a locking script [Checksig $P_A$] which requires a signature Sig $P_A$ of Alice in order for $UTXO_0$ to be redeemed (strictly, in order for a subsequent transaction attempting to redeem $UTXO_0$ to be valid). [Checksig $P_A$] contains the public key $P_A$ from a public-private key pair of Alice. The input 202 of $Tx_1$ comprises a pointer pointing back to $Tx_1$ (e.g. by means of its transaction ID, $TxID_0$, which in embodiments is the hash of the whole transaction $Tx_0$). The input 202 of $Tx_1$ comprises an index identifying $UTXO_0$ within $Tx_0$, to identify it amongst any other possible outputs of $Tx_0$. The input 202 of $Tx_1$ further comprises an unlocking script <Sig $P_A$> which comprises a cryptographic signature of Alice, created by Alice applying her private key from the key pair to a predefined portion of data (sometimes called the "message" in cryptography). What data (or "message") needs to be signed by Alice to provide a valid signature may be defined by the locking script, or by the node protocol, or by a combination of these.

When the new transaction $Tx_1$ arrives at a node 104, the node applies the node protocol. This comprises running the locking script and unlocking script together to check whether the unlocking script meets the condition defined in the locking script (where this condition may comprise one or more criteria). In embodiments this involves concatenating the two scripts:

<Sig $P_A$><$P_A$>||[Checksig $P_A$]

where "||" represents a concatenation and "< ... >" means place the data on the stack, and "[ ... ]" is a function comprised by the unlocking script (in this example a stack-based language). Equivalently the scripts may be run one after the other, with a common stack, rather than concatenating the scripts. Either way, when run together, the scripts use the public key $P_A$ of Alice, as included in the locking script in the output of $Tx_0$, to authenticate that the locking script in the input of $Tx_1$ contains the signature of Alice signing the expected portion of data. The expected portion of data itself (the "message") also needs to be included in $Tx_0$ order to perform this authentication. In embodiments the signed data comprises the whole of $Tx_0$ (so a separate element does to need to be included specifying the signed portion of data in the clear, as it is already inherently present).

The details of authentication by public-private cryptography will be familiar to a person skilled in the art. Basically, if Alice has signed a message by encrypting it with her private key, then given Alice's public key and the message in the clear (the unencrypted message), another entity such as a node 104 is able to authenticate that the encrypted version of the message must have been signed by Alice. Signing typically comprises hashing the message, signing the hash, and tagging this onto the clear version of the message as a signature, thus enabling any holder of the public key to authenticate the signature. Note therefore that any reference herein to signing a particular piece of data or part of a transaction, or such like, can in embodiments mean signing a hash of that piece of data or part of the transaction.

If the unlocking script in $Tx_1$ meets the one or more conditions specified in the locking script of $Tx_0$ (so in the example shown, if Alice's signature is provided in $Tx_1$ and authenticated), then the node 104 deems $Tx_1$ valid. If it is a storage node 104S, this means it will add it to the pool of transactions 154 awaiting proof-of-work. If it is a forwarding node 104F, it will forward the transaction $Tx_1$ to one or more other nodes 104 in the network 106, so that it will be propagated throughout the network. Once $Tx_1$ has been validated and included in the blockchain 150, this defines $UTXO_0$ from $Tx_0$ as spent. Note that $Tx_1$ can only be valid if it spends an unspent transaction output 203. If it attempts to spend an output that has already been spent by another transaction 152, then $Tx_1$ will be invalid even if all the other conditions are met. Hence the node 104 also needs to check whether the referenced UTXO in the preceding transaction $Tx_0$ is already spent (has already formed a valid input to another valid transaction). This is one reason why it is important for the blockchain 150 to impose a defined order on the transactions 152. In practice a given node 104 may maintain a separate database marking which UTXOs 203 in which transactions 152 have been spent, but ultimately what defines whether a UTXO has been spent is whether it has already formed a valid input to another valid transaction in the blockchain 150.

Note that in UTXO-based transaction models, a given UTXO needs to be spent as a whole. It cannot "leave behind" a fraction of the amount defined in the UTXO as spent while another fraction is spent. However the amount from the UTXO can be split between multiple outputs of the next transaction. E.g. the amount defined in $UTXO_0$ in $Tx_0$ can be split between multiple UTXOs in $Tx_1$. Hence if Alice does not want to give Bob all of the amount defined in $UTXO_0$, she can use the remainder to give herself change in a second output of $Tx_1$, or pay another party.

In practice Alice will also usually need to include a fee for the winning miner, because nowadays the reward of the generation transaction alone is not typically sufficient to motivate mining. If Alice does not include a fee for the miner, $Tx_0$ will likely be rejected by the miner nodes 104M, and hence although technically valid, it will still not be propagated and included in the blockchain 150 (the miner protocol does not force miners 104M to accept transactions 152 if they don't want). In some protocols, the mining fee does not require its own separate output 203 (i.e. does not need a separate UTXO). Instead any different between the total amount pointed to by the input(s) 202 and the total amount of specified in the output(s) 203 of a given transaction 152 is automatically given to the winning miner 104. E.g. say a pointer to $UTXO_0$ is the only input to $Tx_1$, and $Tx_1$ has only one output $UTXO_1$. If the amount of the digital asset specified in $UTXO_0$ is greater than the amount specified in $UTXO_1$, then the difference automatically goes to the winning miner 104M. Alternatively or additionally however, it is not necessarily excluded that a miner fee could be specified explicitly in its own one of the UTXOs 203 of the transaction 152.

Note also that if the total amount specified in all the outputs 203 of a given transaction 152 is greater than the total amount pointed to by all its inputs 202, this is another basis for invalidity in most transaction models. Therefore such transactions will not be propagated nor mined into blocks 151.

Alice and Bob's digital assets consist of the unspent UTXOs locked to them in any transactions 152 anywhere in the blockchain 150. Hence typically, the assets of a given party 103 are scattered throughout the UTXOs of various transactions 152 throughout the blockchain 150. There is no one number stored anywhere in the blockchain 150 that defines the total balance of a given party 103. It is the role of the wallet function in the client application 105 to collate together the values of all the various UTXOs which are locked to the respective party and have not yet been spent in another onward transaction. It can do this by querying the copy of the blockchain 150 as stored at any of the storage nodes 104S, e.g. the storage node 104S that is closest or best connected to the respective party's computer equipment 102.

Note that the script code is often represented schematically (i.e. not the exact language). For example, one may write [Checksig$P_A$] to mean [Checksig$P_A$]=OP_DUP OP_HASH160<H($P_A$)>OP_EQUALVERIFY OP_CHECKSIG. "OP_..." refers to a particular opcode of the Script language. OP_CHECKSIG (also called "Checksig") is a Script opcode that takes two inputs (signature and public key) and verifies the signature's validity using the Elliptic Curve Digital Signature Algorithm (ECDSA). At runtime, any occurrences of signature ('sig') are removed from the script but additional requirements, such as a hash puzzle, remain in the transaction verified by the 'sig' input. As another example, OP_RETURN is an opcode of the Script language for creating an unspendable output of a transaction that can store metadata within the transaction, and thereby record the metadata immutably in the blockchain 150. E.g. the metadata could comprise a document which it is desired to store in the blockchain.

The signature $P_A$ is a digital signature. In embodiments this is based on the ECDSA using the elliptic curve secp256k1. A digital signature signs a particular piece of data. In embodiments, for a given transaction the signature will sign part of the transaction input, and all or part of the transaction output. The particular parts of the outputs it signs depends on the SIGHASH flag. The SIGHASH flag is a 4-byte code included at the end of a signature to select which outputs are signed (and thus fixed at the time of signing).

The locking script is sometimes called "scriptPubKey" referring to the fact that it comprises the public key of the party to whom the respective transaction is locked. The unlocking script is sometimes called "scriptSig" referring to the fact that it supplies the corresponding signature. However, more generally it is not essential in all applications of a blockchain 150 that the condition for a UTXO to be redeemed comprises authenticating a signature. More generally the scripting language could be used to define any one or more conditions. Hence the more general terms "locking script" and "unlocking script" may be preferred.

Figure 3:
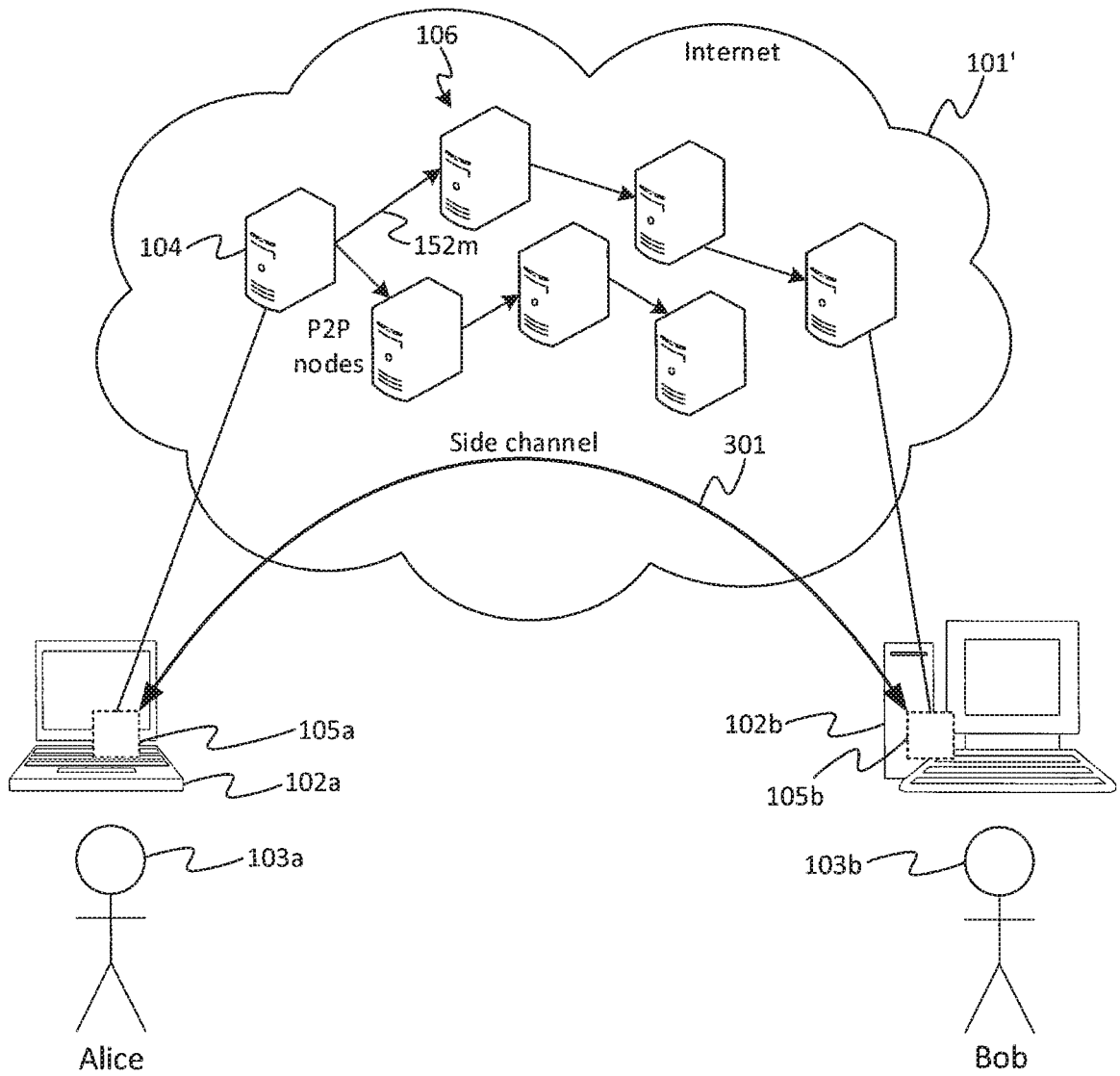
FIG. 3 is a schematic block diagram of another system for implementing a blockchain.

FIG. 3 shows a system 100 for implementing a blockchain 150. The system 100 is substantially the same as that described in relation to FIG. 1 except that additional communication functionality is involved. The client application on each of Alice and Bob's computer equipment 102a, 120b, respectively, comprises additional communication functionality. That is, it enables Alice 103a to establish a separate side channel 301 with Bob 103b (at the instigation of either party or a third party). The side channel 301 enables exchange of data separately from the P2P network. Such communication is sometimes referred to as "off-chain". For instance this may be used to exchange a transaction 152 between Alice and Bob without the transaction (yet) being published onto the network P2P 106 or making its way onto the chain 150, until one of the parties chooses to broadcast it to the network 106. Such a side channel 301 is sometimes used for example as a "payment channel".

The side channel 301 may be established via the same packet-switched network 101 as the P2P overlay network 106. Alternatively or additionally, the side channel 301 may be established via a different network such as a mobile cellular network, or a local area network such as a local wireless network, or even a direct wired or wireless link between Alice and Bob's devices 1021, 102b. Generally, the side channel 301 as referred to anywhere herein may comprise any one or more links via one or more networking technologies or communication media for exchanging data "off-chain", i.e. separately from the P2P overlay network 106. Where more than one link is used, then the bundle or collection of off-chain links as a whole may be referred to as the side channel 301. Note therefore that if it is said that Alice and Bob exchange certain pieces of information or data, or such like, over the side channel 301, then this does not necessarily imply all these pieces of data have to be send over exactly the same link or even the same type of network.

Example Definitions

The following are some example definitions which may be adopted in some implementations. Note that these are not all limiting on all possible implementations and are provided only to aid understanding of certain possible implementations, such as may be employed in some possible implementations of the later-described example use cases.

Definition 1: Transaction. A transaction is a message that contains inputs and outputs. It may also comprise a protocol version number and/or a locktime. The protocol version indicates the version of the transaction protocol. Locktime will be explained separately later.

Definition 2: Inputs. The inputs of a transaction form an ordered list. Each entry in the list comprises an outpoint (identifier for unspent transaction output), and scriptSig (unlocking script). It may also comprise a sequence number.

Definition 3: Outputs. The outputs of a transaction form an ordered list. Each entry in the list comprises a value (the amount of the digital asset in its fundamental units), and scriptPubKey (locking script).

Definition 4: Outpoint. An outpoint is uniquely defined by a transaction ID TxID and an index number i. It refers to the ith entry in the outputs of the transaction TxID, giving the unique location of an unspent transaction output (UTXO). The term 'unspent' here means that the outpoint has never appeared in any valid subsequent transaction.

Definition 5: scriptSig. This is the information required to unlock or to spend the UTXO corresponding to a given outpoint. In a standard transaction, this information is usually an ECDSA signature. Therefore, the script is called 'scriptSig'. However, the required information to unlock the outpoint can be any data that satisfies the locking conditions of the UTXO.

Definition 6: scriptPubKey. This is a script that locks the fund associated with a particular UTXO. The funds are unlocked, and can be spent, if and only if a scriptSig is appended to a scriptPubKey and the execution of the combined script gives TRUE. If this is not the case, the transaction is invalid and will be rejected. It is called 'scriptPubKey' because it generally contains the hash value of an ECDSA public key for standard transactions.

In the next definition, where reference is made to signing an input or inputs, this means to sign an input or inputs excluding the scriptSig part (see Definition 2).

Definition 7: SIGHASH flag. When providing an ECDSA signature, one needs also to append one of the following SIGHASH flags.

| Flag | Functional meaning |
| --- | --- |
| SIGHASH_ALL | Sign all inputs and outputs |
| SIGHASH_SINGLE | Sign all inputs and the output with the same index |
| SIGHASH_NONE | Sign all inputs and no output |
| SIGHASH_ALL \| ANYONECANPAY | Sign its own input and all outputs |
| SIGHASH_SINGLE \| ANYONECANPAY | Sign its own input and the output with the same index |
| SIGHASH_NONE \| ANYONECANPAY | Sign its own input and no output |

When talking about malleability as a feature, one is looking for information in a transaction that is not signed by an ECDSA signature. Apart from inputs and outputs that could be excluded from the message to be signed, the content of the scriptSig is always excluded. This is because the scriptSig is designed to be the placeholder for the signature.

Definition 8: Blockchain time-locks. In general, there are two types of time-lock that can be used in transactions: absolute and relative time-locks. Absolute time-locks specify a specific point in time after which something can be considered 'valid' whereas relative time-locks specify a period that must elapse before something can be considered valid. In both cases, one can use either block height (number of blocks mined) or time elapsed (e.g. UNIX time) as the proxy for time when using blockchain time-locks.

Another property of blockchain time-locks is where they appear and to which aspect(s) of a transaction they apply. There are again, two classifications for time-locks in this sense: transaction-level, which lock entire transactions; and script-level, which lock specific outputs. Both of these time-lock levels can be used to implement either an absolute or relative time-lock. The table below summarises the four possible mechanisms for implementing time-locks that can be created based on these properties.

|       |                   | Type      |          |
|-------|-------------------|-----------|----------|
|       |                   | Absolute  | Relative |
| Level | Transaction Level | nLocktime | nSequence |
|       | Script Level      | OP_CLTV   | OP_CSV   |

Definition 9: nLocktime. The locktime (nLocktime) is a non-negative integer that represents the height of a block or a specific time in Unix time. It is a transaction-level time-lock in the sense that the transaction can only be added to the blockchain after the specified block or the specified time. If nLocktime is set to be less than 500,000,000, it is considered a block height. If it is set to be equal to or greater than 500,000,000, then it is considered as a representation of the Unix time. That is the number of seconds after 00: 00: 00 on the 1 Jan. 1970.

For example, if the current highest block is of height 3,000,000, and the locktime is set to be 4,000,000, then the transaction will not be considered by miners until the 4 millionth block is mined.

Definition 10: nSequence. The sequence number (nSequence) indicates the version of the transaction as a message. Any modification on the transaction will increment the sequence number to a larger one. The maximum value of nSequence is $2^{32}$-1 and, in general, the sequence number will be set to this maximum by default to indicate that the transaction is finalised. The nSequence value is defined for each input of a transaction and specifies the period of time after the UTXO referenced by the input was included in a block before it can be used as a valid input. If a miner sees two transactions with the same input, the miner will choose the transaction with the larger sequence number. However, this feature has been commonly disabled.

Definition 11: CheckLockTimeVerify (OP_CLTV). The opcode OP_CHECKLOCKTIMEVERIFY (OP_CLTV) is an absolute script-level time-lock that can be used to lock a specific output of a transaction to some specific time or block height in the future. If the current Unix time or block height, at which a UTXO is referenced in a transaction, is exceeded by the Unix time or block height at which the UTXO was created plus the parameter specified before the OP_CLTV opcode the script execution for the spending transaction will fail.

Definition 12: CheckSequenceVerify (OP_CSV). The opcode OP_CHECKSEQUENCEVERIFY (OP_CSV) is a relative script-level time-lock that can be used to lock a specific output of a transaction for a specific period of time or number of blocks into the future. This operates similarly to OP_CLTV, the difference being that the parameter provided to OP_CSV represents relative time. If the current Unix time or block height, at which a UTXO is referenced in a transaction, is exceeded by the Unix time or block height at which the UTXO was created plus the parameter specified before the OP_CSV opcode the script execution for the spending transaction will fail.

Definition 13: Malleability. In general, there are two broad types of malleability that are possible in blockchain transactions, both of which allow the content of a transaction to be modified without invalidating the signature provided in an input.

To illustrate both cases, consider an initial transaction Tx which has one input, one signature in that input, and one output.

Type 1: Script-level malleability. This type of malleability takes advantage of the fact that a signature, which is to be checked with the script opcode OP_CHECKSIG, does not sign the script field of any input in a transaction. This fact allows us to generate a signature on a transaction Tx, modify the input script such that the transaction Tx' is non-identical to Tx, and still have both Tx and Tx' be considered valid transaction messages signed by the same signature under the blockchain consensus rules.

Type 2: Input and Output-level malleability. This type of malleability relies on the use of SIGHASH flags other than SIGHASH ALL being employed in a transaction. If a transaction Tx has an input signature that uses any of the five other SIGHASH flag combinations, then either an input(s) or output(s) can be added to create a non-identical transaction Tx', such that both will be considered valid transaction messages according to the consensus, without needing to alter the signature.

Malleability as a Feature

Figure 4:
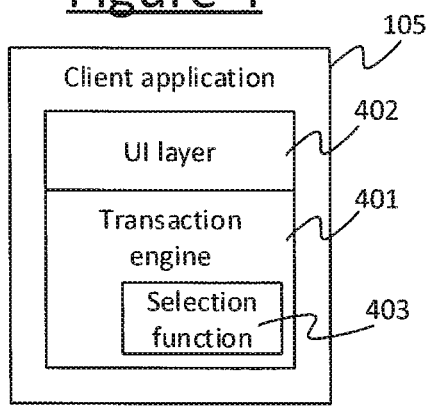
FIG. 4 is a schematic block diagram of a client application.

FIG. 4 illustrates an example implementation of the client application 105 for implementing embodiments of the presently disclosed scheme. The client application 105 comprises a transaction engine 401 and a user interface (UI) layer 402. The transaction engine 401 is configured to implement the underlying transaction-related functionality of the client 105, such as to formulate transactions 152, receive and/or send transactions and/or other data over the side channel 301, and/or send transactions to be propagated through the P2P network 106, in accordance with the schemes discussed above and as will be discussed in further detail shortly. In accordance with embodiments disclosed herein, the transaction engine 401 of at least Bob's client 105b comprises an application function 403 in the form of a selection function, which enables a selection as to which of two or more different versions of a target transaction ("$Tx_p$" and "$Tx_p$'") is to be sent from the respective computer equipment 102 of Bob to be propagated through the P2P network 106 for validation and thus recorded in the blockchain 150 (the propagation and recordal in themselves being by the mechanisms discussed previously). Note again that this sending could comprise sending the target transaction directly from Bob's computer equipment 102b to one of the forwarding nodes 104F of the network 106, or sending the target transaction to Alice's equipment 102b or that of a third party to be forwarded on to one of the nodes 104F of the network 106.

The UI layer 402 is configured to render a user interface via a user input/output (I/O) means of the respective user's computer equipment 102, including outputting information to the respective user 103 via a user output means of the equipment 102, and receiving inputs back from the respective user 103 via a user input means of the equipment 102. For example the user output means could comprise one or more display screens (touch or non-touch screen) for providing a visual output, one or more speakers for providing an audio output, and/or one or more haptic output devices for providing a tactile output, etc. The user input means could comprise for example the input array of one or more touch screens (the same or different as that/those used for the output means); one or more cursor-based devices such as mouse, trackpad or trackball; one or more microphones and speech or voice recognition algorithms for receiving a speech or vocal input; one or more gesture-based input devices for receiving the input in the form of manual or bodily gestures; or one or more mechanical buttons, switches or joysticks, etc.

Note: whilst the various functionality herein may be described as being integrated into the same client application 105, this is not necessarily limiting and instead they could be implemented in a suite of two or more distinct applications, e.g. one being a plug-in to the other. For instance, the functionality of the transaction engine 401 may be implemented in a separate application than the UI layer 402, or the functionality of a given module such as the transaction engine 401 could be split between more than one application. Nor is it excluded that some or all of the described functionality could be implemented at, say, the operating system layer. Where reference is made anywhere herein to a single or given application 105, or such like, it will be appreciated that this is just by way of example, and more generally the described functionality could be implemented in any form of software.

Figure 5:
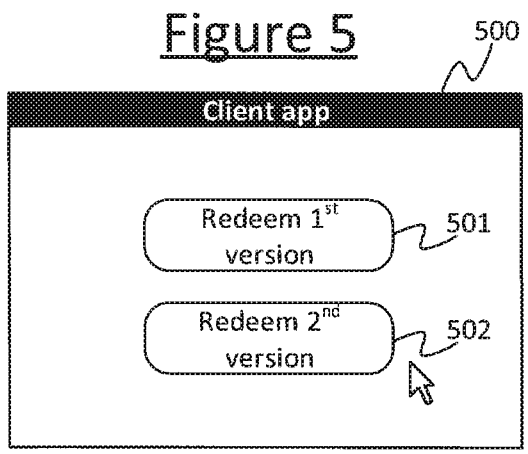
FIG. 5 is a schematic mock-up of an example user interface that may be presented by the client application of FIG. 4.

FIG. 5 gives a mock-up of an example of the user interface (UI) 500 which may be rendered by the UI layer 402 of the client application 105b on Bob's equipment 102b. The user interface 500 comprises at least two user-selectable options 501, 502, which may be rendered as two distinct UI elements via the user output means, such as two on-screen buttons, or two different options in a menu. The user input means is arranged to enable the user 103b (in this case Bob) to select one of the options, such as by clicking or touching the UI element on-screen, or speaking a name of the desired option (N.B. the term "manual" as used herein is meant only to contrast against automatic, and does not limit to the use of the hand or hands). It will be appreciated that the particular means of rendering and selecting the options is not material.

Whatever means are used, each of the options corresponds to a different one of the first and second target transactions, $Tx_p$ and $Tx_p'$. The selection function 403 is configured to interface with the UI layer 402 to enable the following. That is, if Bob 103b selects the first option 501, then this causes the transaction engine 403 to send the first version of the target transaction $Tx_p$ to be propagated through the network 106 and recorded in the blockchain 150; but if Bob 103b selects the second option 502, then this causes the transaction engine 403 to send the first version of the target transaction $Tx_p'$ to be propagated through the network 106 and recorded in the blockchain 150.

It will be appreciated that the UI 500 shown in FIG. 5 is only a schematized mock-up and in practice it may comprise one or more further UI elements, which for conciseness are not illustrated.

As an alternative or in addition to the UI options 501, 502, the selection function 403 may be configured to perform an automated selection between the sending of the first and second versions of the target transaction, $Tx_p$ or $Tx_p'$ for recordal in the blockchain 150. This may be triggered automatically in dependence on a predetermined event or after a predetermined time-out. For instance if event Y occurs before a time-out then the function 403 automatically sends the second version $Tx_p'$ to be propagated through the network 150, but if the time-out elapses before event Y occurs then the function 403 instead automatically sends the first version $Tx_p$. Or if event X occurs then the function 403 automatically sends the first version $Tx_p$ to be propagated through the network 150, but if event Y occurs then the function 403 automatically instead sends the second version $Tx_p'$. In principle the circumstances for automatically sending the first and second versions off to the network 150 could be configured to be virtually anything by the system designer.

Figure 6:
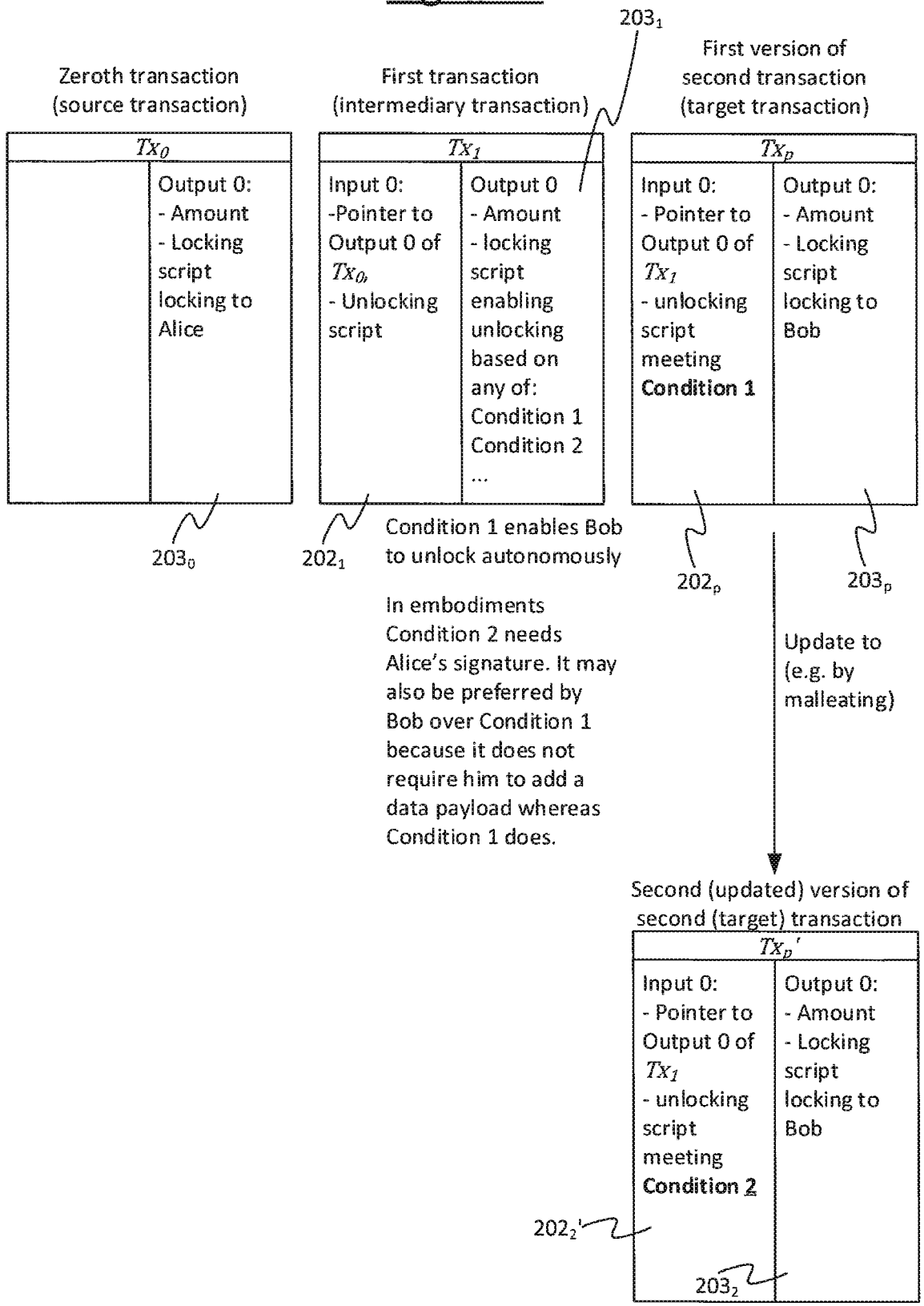
FIG. 6 is a schematic illustration of a set of transactions.

FIG. 6 illustrates a set of transactions 152 for use in accordance with embodiments disclosed herein. The set includes a zeroth transaction $Tx_0$, a first transaction $Tx_1$ and a second transaction $Tx_p/Tx_p'$. Note that these names are just convenient labels. They do not necessarily imply that these transactions will be placed immediately one after another in a block 151 or the blockchain 150, nor that the zeroth transaction is the initial transaction in a block 151 or the blockchain 150. Nor do these labels necessarily imply anything about the order their transactions are sent to the network 106. They refer only to a logical series in that the output of one transaction is pointed to by the input of the next transaction. Remember that in some systems it is possible to send a parent to the network 106 after its child (in which case the "orphan" child will be buffered for a period at one or more nodes 104 while waiting for the parent to arrive).

Two transactions $Tx_p$ or $Tx_p'$ may be said to be versions of (substantially) the same transaction if both contain an input that references the same output (e.g. same UTXO) of the first transaction. The different versions may provide different functionality by meeting a different unlocking condition of that output. The different versions may also both contain identical input signatures (i.e. the signed message in either instance is identical). Some embodiments, discussed later, may also involve different instances of the first transaction $Tx_i$ (where i=1, 2, 3, . . . ). Two (or more) transactions may be said herein to be instances of (substantially) the same first transaction if both contain an input that references the same output (e.g. UTXO) of the same source transaction (or "zeroth" transaction) $Tx_0$. They may redeem that input based on meeting the same unlocking condition. They may however contain different input signatures (i.e. the signed message in either instance is non-identical). The different instances may serve substantially the same function, but as payment for different respective data portions and specifying an increasing amount of the digital asset. This will be discussed in more detail later with reference to FIGS. 7-9 and Example Use Case 2.

The zeroth transaction $Tx_0$ may also be referred to as the source transaction for the present purposes, in that it acts as a source of an amount of the digital asset which is locked to Alice 103a. The first transaction $Tx_1$ may also be referred to as the intermediary transaction or conditional transaction for the present purposes, in that it acts as an intermediary for conditionally transferring the amount of digital asset from the source transaction $Tx_0$. The second transaction $Tx_p/Tx_p'$ may also be referred to as the target transaction, or payment transaction (hence the subscript "P"), as it is the transaction that will unlock one of the conditions and deliver the payment for Bob (or potentially a beneficiary on behalf of whom Bob is acting). As has been mentioned, the target transaction has two versions, the first version $Tx_p$ and the second version $Tx_p'$. These transactions will each exist at at least some point in time, manifested either at the computer equipment 102a of Alice (the first party), or the computer equipment 102b of Bob (the second party), or that of a third party (not shown), or any combination of these. The two versions $Tx_p$ and $Tx_p'$ may exist for a period together in parallel, or one after another, or overlapping partially in time.

As shown in FIG. 6, the source transaction $Tx_0$ comprises at least one output $203_0$ (e.g. output 0 of $Tx_0$) which specifies an amount of the digital asset, and which further comprises a locking script locking this output to Alice 103a. This means that the locking script of the source transaction $Tx_0$ requires at least one condition to be met, which is that the input of any transaction attempting to unlock the output (and therefore redeem the amount of the digital asset) must include a cryptographic signature of Alice (i.e. using Alice's public key) in its unlocking script. In this sense the amount defined in the output of $Tx_0$ may be said to be owned by Alice. The output may be referred to as a UTXO. It is not particularly material for the present purposes which output of which preceding transaction the inputs of $Tx_0$ point back to (as long as they are sufficient to cover the total output(s) of $Tx_0$).

In the present case the transaction unlocking the output of the source transaction $Tx_0$ is the first, or intermediary, transaction $Tx_1$. Therefore $Tx_1$ has at least one input $202_1$ (e.g. input 0 of $Tx_1$) which comprises a pointer to the relevant output of $Tx_0$ (output 0 of $Tx_0$ in the illustrated example), and which further comprises an unlocking script configured to unlock the pointed-to output of $Tx_0$ according to the condition defined in the locking script of that output, which requires at least a signature of Alice. The signature required from Alice by the locking script of $Tx_0$ is required to sign some part of $Tx_1$. In some protocols the part of $Tx_1$ that needs to be signed can be a setting defined in the unlocking script of $Tx_1$. E.g. this may be set by the SIGHASH flag, which is one byte that is appended to the signature, so in terms of data the unlocking script appears as: <Sig $P_A$><sighashflag><$P_A$>. Alternatively the part that needs to be signed could simply be a fixed part of $Tx_1$. Either way, the part to be signed typically excludes the unlocking script itself, and may exclude some or all of the inputs of $Tx_1$. This means the inputs of $Tx_1$ are malleable.

The first or intermediary transaction $Tx_1$ has at least one output $203_1$ (e.g. output 0 of $Tx_1$, which again the output may be referred to as a UTXO). The output of the intermediary transaction $Tx_1$ is not locked unconditionally to any one party. Like $Tx_0$ it has at least one output (e.g. output 0 of $Tx_1$) which specifies an amount of digital asset to be transferred onwards, and which further comprises a locking script defining what is required to unlock that output and hence redeem this amount. However, this locking script allows its output to be unlocked based on any one of multiple different possible conditions, including at least: i) a first condition ("Condition 1") and ii) a second condition ("Condition 2").

The second, target transaction $Tx_p/Tx_p'$ has at least one input $202p$ (e.g. input 0 of $Tx_p/Tx_p'$) which comprises a pointer to the above-mentioned output of $Tx_1$ (output 0 of $Tx_1$, in the example shown), and which also comprises an unlocking script configured to unlock said output of $Tx_1$ based on meeting one of the multiple alternative conditions defined in the locking script of $Tx_1$. In the first version of the target transaction $Tx_p$, the unlocking script is configured to meet the first condition, Condition 1. At some point a second version of the target transaction will also be created $Tx_p'$ In the second version, the unlocking script is configured to meet the second condition, Condition 2.

The second, target transaction $Tx_p/Tx_p'$ has at least one output $202p$ (e.g. Output 0 of $Tx_p/Tx_p'$) which, in either version, specifies an amount of the digital asset to transfer to Bob, and a locking script locking this to Bob (i.e. it would require a further, onward transaction including Bob's signature in the unlocking script to spend). In this sense the output of the target transaction $Tx_p/Tx_p'$ can be said to be owned by Bob. This output may again be referred to as a UTXO.

In embodiments the first condition requires that the unlocking script of whichever transaction is attempting to unlock $Tx_1$—in this case the first version of the target transaction $Tx_p$— includes in its unlocking script a cryptographic signature of Bob, and/or a data payload which may be data of Bob which Bob will have to provide or include. The requirement to include the data payload can be imposed by a hash challenge included in the locking script of $Tx_1$. The challenge comprises a hash of the data (not the data itself), along with a piece of script configured so as (when run on a node 104 together with the unlocking script) to test whether a hash of the data provided in the corresponding unlocking script equals the hash value provided in the locking script. The requirement for a signature can be imposed for example by the CheckSig discussed previously. In embodiments the first condition does not require Alice's signature to be included in the unlocking script of $Tx_p$. The part of $Tx_p$ that needs to be signed by Bob may be a setting of the unlocking script of $Tx_p$ (e.g. specified by the SIGHASH flag), or could be fixed. Either way, it excludes at least the unlocking script. Therefore the unlocking script of $Tx_p$ is malleable.

In embodiments the second condition requires that the unlocking script of whichever transaction is attempting to unlock $Tx_1$—in this case the second version of the target transaction $Tx_p'$—includes in its unlocking script both a cryptographic signature of Bob and a cryptographic signature of Alice. Again this can be imposed for example by CheckSig. In embodiments the first condition does not require the data payload to be included in the unlocking script of $Tx_p'$ The part of $Tx_p'$ that needs to be signed by Alice and Bob may be a setting of the unlocking script of $Tx_p'$ (e.g. specified by the SIGHASH flag), or could be fixed.

The zeroth (i.e. source) transaction $Tx_0$ may be generated by Alice, Bob or a third party. It will typically require the signature of the preceding party from whom Alice obtained the amount defined in the input of $Tx_0$. It may be sent to the network 106 by Alice, Bob, the preceding party, or another third party.

The first (i.e. intermediary, conditional) transaction $Tx_1$ may also be generated by Alice, Bob or a third party. Since in embodiments it requires Alice's signature, it may be generated by Alice. Alternatively it may be generated by Bob or a third party as a template then sent to Alice to sign, e.g. being sent over the side channel 301. Alice can then send the signed transaction to the network 106 herself, or send it to Bob or a third party for them to forward to the network 106, or just send her signature for Bob or the third party to assemble into the signed $Tx_1$ and forward to the network 106. Again any off-chain exchanges prior to sending $Tx_1$ to the network 106 may be performed over the side channel 301.

Either version of the second (i.e. target or payment) transaction $Tx_p/Tx_p'$ may be generated by Alice, Bob or a third party. As the first version requires Bob's signature and/or data, it may be generated by Bob. Alternatively it may be generated as a template by Alice or a third party then sent to Bob to sign and add the data, e.g. being sent to Bob over the side channel 301. Bob can then send the signed transaction to the network 106 himself, or send it to Alice or a third party for them to forward to the network 106, or just send his signature and data for Alice or the third party to assemble into the signed $Tx_p$ and forward to the network. In embodiments the second version requires both the signatures of Bob and Alice. Hence it may be generated as a template by Alice or Bob and sent to the other as a template to add their signature, e.g. again over the side channel 301. Alternatively it could be generated as a template by a third party and then sent to Alice, where Alice adds her signature and forwards to Bob to add his signature. Bob then forwards the signed transaction to the network 106, or sends back to Alice or the third party for them to forward to the network 106. Or $Tx_p'$ could be generated as a template by a third party and then sent to Bob, where Bob adds his signature and then forwards to Alice to add her signature. Alice then forwards the signed transaction to the network 106, or sends back to Bob or the third party for them to forward to the network 106. In further variants, Alice and/or Bob sign the received transaction template and just return their signature to one of the other parties, for that party to assemble into $Tx_p'$ and forward to the network 106. Again any off-chain exchanges prior to sending $Tx_p$ and/or $Tx_p'$ to the network 106 may be performed over the side channel 301.

It will be appreciated that there are various locations at which the different elements of a transaction can be generated and assembled, and various ways for it to be sent onwards directly or vicariously to the ultimate destination of the P2P network 106. The scope of implementation of the disclosed techniques is not limited in any of these respects.

It will also be appreciated that phrases such as "by Alice", "by Bob" and "by a third party" herein may be used as a short-hand for "by the computer equipment 102a of Alice 103a", "by the computer equipment 102b of Bob 103b", and "by computer equipment of the third party", respectively. Also, note again that the equipment of a given party could comprise one or more user devices used by that party, or server resources such as cloud resources employed by that party, or any combination of these. It does not necessarily limit the actions to being performed on a single user device.

Since the unlocking script of the target transaction $Tx_p$ is malleable, then in embodiments the second version of the target transaction $Tx_p'$ may be generated by malleating the first version $Tx_p$, i.e. taking the existing data structure of $Tx_p$ and modifying it to form the second version $Tx_p'$—in this case by malleating the locking script. This is an example of script-level malleability. In an equivalent variant however $Tx_p'$ may be generated by creating a new version of the target transaction with the same structure except for the different unlocking script. "Updating" may be used herein as general term to describe either possibility of malleating the existing structure or creating a new, replacement version. Malleation may be referred to in relation to various embodiments herein by way of example, but it will be appreciated that this could be replaced by the creation of a new version of target transaction from scratch. Either way, the malleation or the creation of the new version may be performed by Alice and/or Bob, and/or a third party given Alice and/or Bob's signatures.

In some embodiments the locking script of $Tx_1$ may include a third unlocking condition, as an alternative to both the first and second conditions. The third condition may require that a lock-time has expired and that the signature of Alice is included in the unlocking script of a third version of the target transaction $Tx_p''$. This enables Alice to claim back her payment from the output of $Tx_1$ if Bob does not claim it based on either of the first and second conditions (e.g. because he does not engage in the process at all or fails to do so within the time limit). The locktime may be defined as an absolute point in time, or a period of time to be elapsed, e.g. measured in seconds or number of blocks mined.

Example Use Case 1—Security for Bob

As mentioned, in embodiments, in $Tx_1$ the first condition i) requires Bob's signature plus a data payload to be included in the unlocking script of $Tx_p$, but not Alice's signature; and the second condition ii) requires both Alice's and Bob's signature but not the data payload to be included in the unlocking script of $Tx_p'$.

Say that Alice wants to pay Bob to provide her with some service, such as to do some DIY for her, provide some goods, provide some consultancy services, etc. Alice creates the first (intermediary) transaction $Tx_1$ including a payment for the service in its output (output 0 of $Tx_1$ referring to the above example). She sends this to Bob over the side channel 301. Alternatively the first transaction could be created by Bob, or by a third party. It could be sent off to be propagated over the network 106 for recordal in the blockchain 150 at this stage by any of Alice, Bob or a third party; or it could be sent off to the network 106 later by any of these parties, at the same time as the second, target transaction $Tx_p/Tx_p'$ or even after the target transaction.

Alice also sends to Bob, over the side channel 301, the first version of the target transaction $Tx_p$ as a template for Bob to sign and add the data payload (or the payload could be included by Alice). Alternatively the first version of the target transaction could be created by Bob, or by a third party as a template for Bob to sign and add his data payload (or the third party could include the payload). Bob keeps a copy of the first version of the target transaction $Tx_p$, at least until the second version $Tx_p'$ is obtained, or alternatively the first version $Tx_p$ could be kept by a third party on behalf of Bob given Bob's signature and data.

The target transaction $Tx_p$ initially contains the data payload and so can be redeemed unilaterally by Bob (or on behalf of Bob) without needing Alice's signature, but only if the data payload is included in the unlocking script. This would be more expensive to be mined, and/or may compromise Bob's private or proprietary data. Therefore Bob would prefer to keep Alice happy and have her provide the second, updated version of the target transaction $Tx_p'$ including her signature (or to send her signature which Bob or a third party assembles into the target transaction $Tx_p'$). This will allow Bob to redeem the output of $Tx_1$ without having to include the data payload in the target transaction $Tx_p'$. However, if Bob provides the service but Alice reneges on the agreement, or there is a dispute about the satisfactory provision of the service, Bob still has the fall-back of redeeming the output of $Tx_1$ based on the less preferred first condition, requiring the data payload to be included in the target transaction $Tx_p$.

When Bob has completed the service for Alice, if Alice is honest and content with the service then she will provide her signature. The second version of the target transaction $Tx_p'$ requires both Alice's and Bob's signature. Bob may send the first version $Tx_p$, with or without the data payload, to Alice over the side channel 301 for Alice to malleate by signing with her signature (and removing the data if still present). Or Bob may simply send his signature to Alice over the side channel 301 for Alice to assemble into the second version $Tx_p'$. Alice may then send this version off to be propagated though the P2P network 106 and recorded in the blockchain 150 (sometimes referred to as "broadcasting" or "publishing" the transaction to the network 106). Alternatively Alice may return the complete second version of the target transaction $Tx_p'$ to Bob over the side channel 301 for Bob to broadcast to the network 106, or send it to a third party over a side channel for the third party to broadcast. As another example, Alice generates her signature based on the first or second version (remembering that the only difference between them is in the malleable part), and sends just her signature to Bob over the side channel 301. Bob then assembles Alice's signature into the complete second version of the target transaction $Tx_p'$ along with his signature, and broadcasts to the network 106 or sends to a third party over a side channel for the third party to broadcast. Or in another alternative, both Alice and Bob send their signatures to a third party over a side channel for the third party to assemble into the complete second version of the target transaction $Tx_p'$ and broadcast to the network 106.

The first transaction $Tx_1$ and indeed the source transaction also need to be broadcast to the network 106 for recordal in the blockchain 150. This can be done at any point by any party, as long as they all end up being validated at some stage.

The fact that the first condition does not require Alice's signature means that Bob can autonomously redeem the amount defined in the output of $Tx_1$ based on the first condition using the first version of the target transaction $Tx_p$, even if Alice does not provide her authorization by means of her signature. However, the requirement to include the data payload is onerous. Miners 104M require a mining fee to accept transactions for mining. If the fee is not sufficient they will not accept the transaction for mining into a block 151, even if the transaction is valid (validity and acceptability are distinct concepts). Alternatively or additionally, the data in question may be private, sensitive or proprietary to Bob, such that having to publish the data to the blockchain 150 would represent another form of penalty to Bob. Thus Bob is incentivised to provide a good service in order to try to obtain Alice's signature and redeem $Tx_1$ based on the preferred second condition using the second version of the target transaction $Tx_p'$. However, if Alice reneges, Bob can still redeem $Tx_1$ based on the less-preferred first condition using the first version of the target transaction $Tx_p$. Thus the first version $Tx_p$ acts as a kind of surety or deposit for Bob.

Note that the requirement in the first condition in the locking script of $Tx_1$ does not require the data payload itself to be included in the locking script of $Tx_1$ nor to be known by Alice, even in the case where $Tx_1$ is formulated by Alice. Rather, it only requires the hash of the data payload to be included in the locking script of $Tx_1$ (along with script challenging the unlocking script of $Tx_p$ to provide data which, when hashed at a node 104, will match the hash value in the unlocking script). Hence even if Alice or a third party formulates $Tx_1$, Bob only needs to give them the hash of his data and not the data itself. It is only if he has to publish the first version of the target transaction $Tx_p$ to the chain that he has to publish the data.

Example Use Case 2—Streaming

Figure 7:
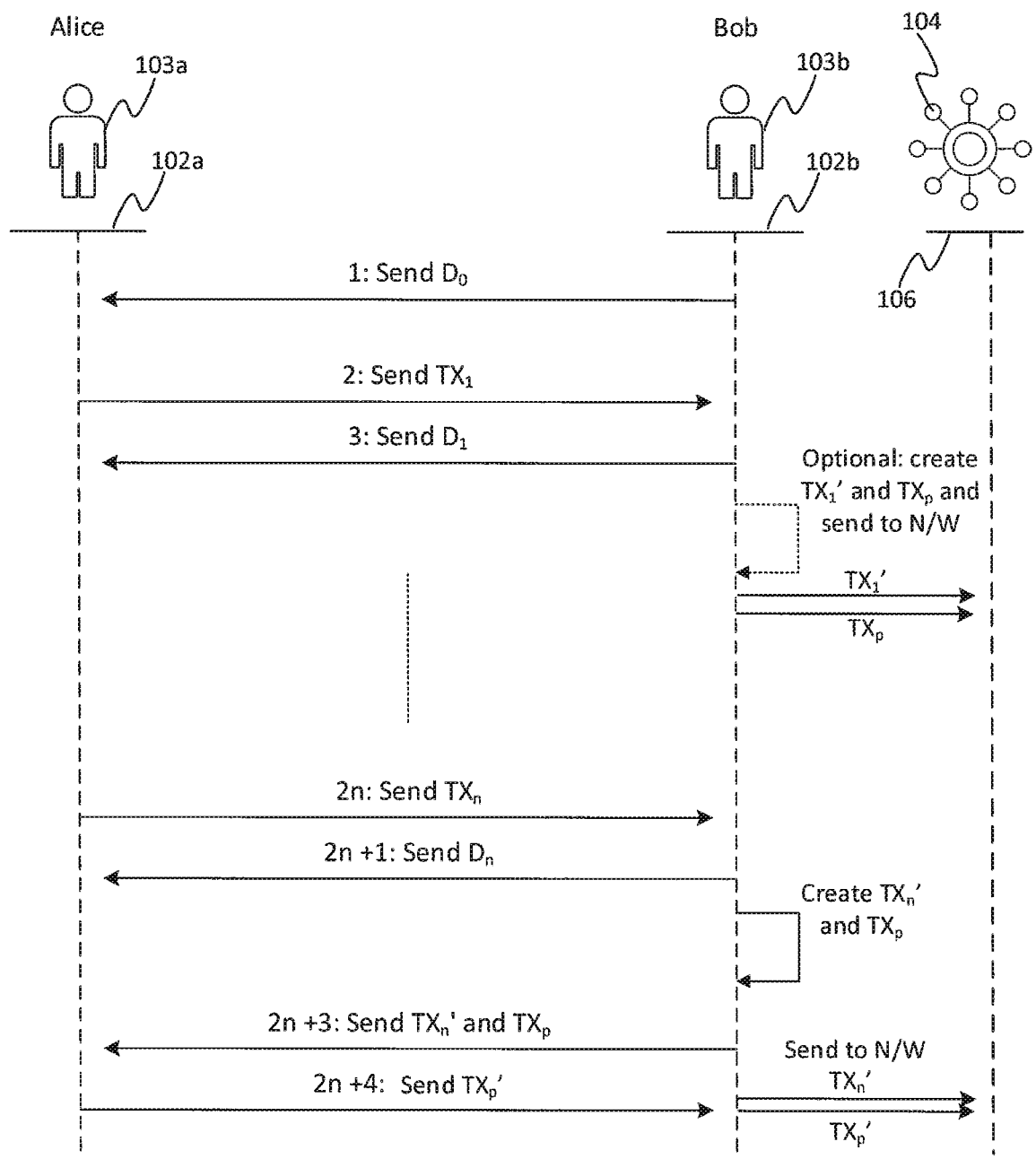
FIG. 7 is a signalling chart showing a method of streaming data.

Referring to FIG. 7, say Alice wishes to pay to stream some data from Bob. The data will be transferred from Bob to Alice "chunk by chunk", i.e. in a sequence of portions $D_0$, $D_1$, $D_2$, etc. These could be for example portions of an item of media content that Alice is streaming from Bob, e.g. comprising a video track such as a movie, and/or an audio track such as a piece of music. Video may comprise any time-varying images or graphics, e.g. a movie, TV show, slide show or other such sequence or still images, animated vector graphics, and/or game content. Audio could comprise sampled audio and/or synthesized audio, comprising speech, music, noises and/or effects or such like. In another example, the following techniques could be used to enable Alice to "pay as she goes" for a service, e.g. the provisions of a utility such as gas, electricity or water; or rental of a vehicle, piece of real estate or other physical object. In the case of paying for a service, then instead of the data portions being portions of the desired content per se, each data portion $D_0$, $D_1$, $D_2$, etc., comprises a different respective key required to unlock a unit of the service. For instance Alice's gas, electricity or water supply is governed by a smart mater connected to her computer equipment 102a. With each received key she supplies this from her computer equipment 102a to her meter which unlocks another unit of the utility in response to verifying the respective key.

It would be desirable to stream the portions of data in such a way that Bob's payment is proportional to the number of data portions received so far. To do this, Alice can return a respective signed transaction $Tx_1$, $Tx_2$, $Tx_3$ . . . to Bob over a side channel 301 in response to each data portion $D_0$, $D_1$, $D_2$ . . . received from Bob. This will mean that if Bob stops sending data, then Alice can simply stop sending payments; and if Alice stops sending payments, Bob can simply stop sending data and has given away no more than one portion of data D that Alice has not paid for.

However, it would also be desirable to implement this in such a way that does not require an individual transaction to be broadcast to the network 106 and recorded in the blockchain 150 for each individual portion of data $D_0$, $D_1$, $D_2$, etc., being streamed, as this would increase network congestion and bloat the blockchain 150.

To address this, each transaction $Tx_1$, $Tx_2$, $TX_3$ . . . which Alice sends back to Bob, in response to each data portion $D_0$, $D_1$, $D_2$ . . . she receives from Bob respectively, is a different instance of a first transaction pointing back to the same output (e.g. same UTXO) of the same source transaction $Tx_0$. Since the amount of the first transaction increases each time, then Bob just claims the output of the last one at the end of some defined sequence, e.g. the end of the audio or video track (e.g. end of the movie), or a specified period of the service (e.g. one per hour, day, week or month). This will be explained in more detail shortly with further reference to FIG. 7.

It would also be preferable to stream the portions in such a way that, firstly, Bob cannot cheat by not sending data and still get a payment from Alice; and secondly, Alice cannot cheat by receiving the data and not paying Bob.

In embodiments, each instance of the first transaction has multiple outputs which total a greater amount of the digital asset than pointed to by its input(s). This means the transaction is not valid until someone, in practice Bob, adds another input of his own to make up the difference (an example of input level malleability). This stops Alice publishing an early transaction in the sequence, which would block Bob from publishing a later one. This therefore enables the streaming without an initial funding transaction to act as a deposit for the whole movie or such like. This will be discussed in more detail shortly with reference to FIG. 8.

To implement the streaming method, Alice and Bob establish an off-chain side channel 301 between them. I.e. transactions sent over this channel will not (yet) be published to the P2P network for recordal in the blockchain 150. This will be used as a modified form of payment channel, also termed herein as a "micropayment channel". Further-more, Bob makes available to Alice a hash set for the data portions $D_0, D_1, D_2 \ldots$ in the sequence. E.g. Bob could send Alice the hash set over the payment channel 301, or could make it publicly available to access from a server on the Internet 101 or such like. The hash set comprises a set of hashes which enable Alice to create a hash challenge for the data, without herself having to know the data itself in advance. E.g. the hash set may comprise a hash tree, also known as a Merkle tree (note that the term Merkle tree is used herein in its broadest sense to mean any hash tree, and does not necessarily limit to, e.g., a binary branching). Alternatively the hash set could comprise a hash chain or hash list.

Bob begins by sending Alice the first data potion $D_0$ over the payment channel 301. This first portion is sent for free or on trust. If Alice does not pay, Bob will have lost out no more than the first portions' worth of data. Assuming Alice does wish to continue, then in response to receiving $D_0$ she sends Bob the first instance of the first transaction $Tx_1$ over the payment channel 301. In response to this, Bob sends Alice the next data portion $D_1$ in the sequence, then in response to this Alice sends Bob the second instance of the first transaction $Tx_2$, then Bob sends Alice $D_2$, Alice sends Bob $Tx_2$, and so forth, all over the payment channel 301. Each instance of the first transaction $Tx_1$, $Tx_2$, $Tx_3$ . . . specifies an increasing payment to Bob, e.g. increasing linearly with the number of data portions D received so far. However each instance of the first transaction $Tx_1$, $Tx_2$, $Tx_3$ . . . points back to the same UTXO of Alice. Therefore Bob can only construct a valid instance of the second, target transaction $Tx_p/Tx_p'$ claiming the payment from one of them (any attempt to redeem the same UTXO twice would be rejected by the network 106 as an invalid). Assuming all goes well, Bob will therefore create a version of the target transaction claiming the payment from the last instance of the first transaction in the sequence.

In embodiments, each instance of the first transaction $Tx_1$, $Tx_2$, $Tx_3$ . . . , or at least the final instance $Tx_n$, defines multiple alternative conditions for redeeming the payment from Alice in the output of that transaction, as discussed previously (e.g. with reference to FIG. 5). In this case, then as well as Alice's acknowledgment $Tx_n$ of the last data portion $D_n$ in the sequence, she also provides the second version of the target transaction $Tx_p$, or at least provides her signature enabling Bob to assemble $Tx_p'$ This enables Bob to claim the payment for the full sequence (e.g. whole movie) based on the preferred second condition, rather than the first condition which penalizes Bob. If Bob stops streaming portions D, and Alice is dissatisfied, she may not provide her signature as needed to meet the second condition, and hence Bob can only claim the payment based on the first, less preferred condition. On the other hand if Alice stops requesting further portions part way through but is not dissatisfied (e.g. she simply chose to stop watching the movie), and assuming each of the instances of the first transaction $Tx_1$, $Tx_2$, $Tx_3$ . . . so far included the multiple alternative conditions, then Alice may provide $Tx_p'$ or her signature to enable Bob to claim the payment for the sequence so far based on the preferred second condition.

The instances i=1, 2, 3 . . . of the first transaction Tx use a common UTXO but use signatures on different messages. Therefore instances in this context refer to the respective 'requests' for data from Alice as instances of a transaction (discussed shortly). This is because changing the value and requested data does change the signed message.

Versions of the second transaction $Tx_p/Tx_p'$ use a common UTXO but use signatures on identical messages. Therefore in this context versions refer to the 'unmalleated' and 'malleated' forms of a transaction as respective versions of a transaction. This is because script-level malleation does not change the signed message.

Note: any of the variants discussed previously as to which party generates and/or broadcasts the first transaction $Tx_1$ . . . and the first and second versions of the target transaction $Tx_p/Tx_p'$ may also apply here. E.g. a third party could generate and/or broadcast some or all of these on behalf of Alice or Bob, or Bob could send $Tx_p/Tx_p'$ to the network himself or send to Alice to broadcast, or send his signature to Alice for Alice to assemble the targeted transaction $Tx_p/Tx_p'$, etc. For conciseness these various options are not repeated again in full here.

As an example consider the movie industry. The script size limit is 10 kilobytes at the time of writing. Therefore, for each movie, it can be split into many 8-kilobytes portions. The size of a portion may be even smaller if there are other constraints, or could be greater if the script size limit is increased. Once the portions are defined, a Merkle tree can then be constructed, and the root hash is publicly listed along with the movie title.

For simplicity, the discussion will assume that the mining fee is implicitly applied. If the explicit input cannot cover the explicit output plus the implied transaction fee, assume that there is another implicit input.

Alice is going to purchase a movie from Bob. The movie is defined by n+1 small data packs $D_0, \ldots, D_n$, and their Merkle tree T with root hash $H_{root}$. The method will construct a series of transactions $TX_1, TX_2, \ldots, TX_n$ from Alice to Bob. Each transaction TX, corresponds to a request for $D_i$ and an acknowledgement of receiving $D_{i-1}$. Ideally, when the payment channel 301 is closed properly, only two transactions, $TX_n'$, and $TX_p'$ will be published to complete the payment from Alice to Bob. This scenario is depicted in FIG. 7, which is a sequence diagram for the payment channel 301 between Alice and Bob in Use Case 2. Note that there is one initial message from Bob to Alice, followed by n message pairs for each data packet, and two final messages for closing the channel.

First Round—Alice's Turn: Initially, Bob sends Alice $D_0$ and the full Merkle tree comprising the expected data packs. Alice checks that the root hash indeed belongs to the movie title of her choice and verifies the Merkle path of $D_0$. Once Alice is happy with the data received, she constructs $TX_1$ to acknowledge that she has received $D_0$ and would like to request $D_1$. This transaction may take the following form.

$TX_1$

Locktime: 0

Input 0:

Alice's unspent outpoint ($TxID_0$, vout=0)

Alice's signature and SIGHASH_ALL|ANYONECANPAY

Output 0:

Locking conditions:

(i) If Bob provides $D_1$ and his signature, he can claim the output.

(ii) Else if both Alice and Bob provide their signatures, Bob can claim the output.

(iii) Else, after 720 blocks (since this transaction is mined), Alice can claim the output.

Value: 500 units of the digital asset
Output 1:
  Alice's change
Output 1:
  Pay Bob the same amount as in Output 1

An example instantiation of this is shown in FIG. 9. This single transaction design has three intended functionalities. By assigning extra implications to some fields in a transaction, it is possible to replace multiple messages that are required in a data trade scenario with just one single transaction template. $Sig(P_A, Tx_1)$ is a signature that acknowledges that the previous data pack has been received and is of satisfaction. OP_DUP OP_SHA256<H($D_1$)>OP_EQUAL is a request that asks for the next pack of data. 500 units is the payment for the next pack of data.

The input(s) of $Tx_1$ comprise at least Input 0. This comprises a pointer to a UTXO of a previous transaction $Tx_0$ locked to Alice, the amount of which (e.g. 2000 units) is larger than Output 0 of $Tx_1$ (see below). Input 0 of $Tx_1$ also comprises Alice's signature in the unlocking script of the input, and a flag enabling other parties to add inputs ("ANYONECANPAY").

The output(s) of $Tx_1$ comprise at least Output 0. This specifies an (initially) small amount of the digital asset (e.g. 500 units), smaller than Input 0 of $Tx_1$. Output 0 of $Tx_1$ also comprises a locking script enabling this to be unlocked on any of the conditions:
  i) the unlocking script in the input of a subsequent transaction $Tx_p$ contains $D_1$ and Bob's signature;
  ii) the unlocking script in the input of a subsequent transaction $Tx_p'$ contains Alice's signature and Bob's signature; OR
  iii) a time-out limit has elapsed, and the unlocking script in the input of a subsequent transaction contains Alice's signature Regarding condition i), Alice knows what data portion to expect because Bob has sent her a Merkle tree, also called a hash tree. This lets her determine a hash of $D_1$, which is enough for her to include this condition by way of a hash challenge (the locking script of $Tx_1$ contains the hash of $D_1$ plus some code checking that the value presented in the unlocking script of the input of $Tx_p$, when hashed, matches the value in the locking script). This condition means that if Bob wanted to claim the payment now without Alice's signature, he would have to upload $D_1$ to the blockchain 150, which he would prefer not to do since $D_1$ is his proprietary data and also because the size of $D_1$ would incur a high mining fee. This same technique can also be used for subsequent data portions $D_2$, $D_3$, etc.

Condition ii) will enable Bob to claim the payment without having to upload the data, if he instead gets Alice to give her signature. However, assume he does not wish to do so yet.

Condition iii) is optional. It gives Alice the ability to claim back the amount in Output 0 of $Tx_1$ if Bob does not claim it for any reason after a certain specified time-out period (e.g. Bob never engages in the process). It will be appreciated that the particular time-out value of 720 blocks is just an example. More generally the time-out period could be defined in terms of a number of blocks or human time such as seconds, and could be set at any value. It could be defined as expiring at an absolute point in time or an amount of time elapsed.

$Tx_1$ may also optionally comprise one or more further outputs. In embodiments these comprise Output 1 and Output 2. Output 1 comprises a script defining an amount of the digital asset equal to the input amount, and locking this to Alice ("Alice's change"). E.g. this is 2000-500 units=1500 units.

Output 2 comprises a script defining an amount of the digital asset equal to Output 1, locking this to Bob ("pay Bob the same as Alice's change in Output 1"). The effect of this is out total outputs (500+1500+1500 units=3500 units in the example) is always greater than the input, unless someone else (who in practice would only be Bob) adds another Input 1 of his own to $Tx_1$ in order to make up the difference.

Output 2 is a trick designed to prevent Alice from publishing the transaction without Bob's acknowledgement. As the payer, Alice is not initially incentivised to broadcast $TX_1$. However, after a few rounds, when there are other transactions in which Alice pays more to Bob, Alice could use $TX_1$ to invalidate them by broadcasting it to the network 106 before Bob uses a later instance to claim his payment. By including Output 2, $TX_1$ will not be valid until Bob adds his own input (Input 1) to $TX_1$ in order to cover the deficit between the outputs and the input. Bob will be able to add an extra input because Alice uses the SIGHASH flag "ALLI-ANYONECANPAY". As a result, $TX_1$ will likely be broadcasted only by Bob. Alice would not want to add the extra input needed to make $Tx_1$ valid as this would cost her more than if she did not cheat the system Alice's change is defined to be the value of Alice's input (Input 0) minus the value of Bob's payment (Output 0). As the graph in FIG. 8 shows, Bob's insurance (Output 2) will ensure that the total output (dashed lines) is always greater than the input before the last data portion is sent.

More generally, other combinations of outputs could be used to create a situation where the total output value of $Tx_1$ is greater than the total input value, thus requiring Bob to add an input of his own to claim Output 0 of $Tx_1$ and disincentivizing Alice from broadcasting $Tx_1$.

As an example for implementing the three conditions i), ii) and ii) in Output 0 in a script language, one can use a hash puzzle and conditional opcodes, e.g. as follows.

```
OP_DUP OP_HASH256 < hash of D1 > OP_EQUAL
OP_IF
    OP_DROP OP_DUP OP_SHA256 < hash of Bob's public key >
OP_EQUALVERIFY
    OP_CHECKSIGVERIFY
OP_ELSE
    2 < hash of Alice's public key > < hash of Bob's public key > 2
    OP_CHECKMULTISIG
    OP_IF
        OP_VERIFY
    OP_ELSE
    < 720 blocks > OP_CHECKSEQUENCEVERIFY
        OP_DUP OP_SHA256 < hash of Alice's public key >
        OP_EQUALVERIFY OP_CHECKSIGVERIFY
    OP_ENDIF
OP_ENDIF
```

First Round—Bob's Turn: When Bob receives the transaction $TX_1$, he simply sends $D_1$ to Alice. Note that Bob is safe to do this as he could claim the payment in $TX_1$, without any assistance from Alice, by doing the following. Firstly, Bob would create $TX_1'$ by adding an input of his own, using outpoint ($TxID_B$, vout=0), to cover the value of Output 2 in $TX_1$. Secondly Bob would create another transaction $TX_p$ to claim the payment:

$TX_p$
Locktime: 0
Input 0:
  The outpoint from $TX_1$' Output 0.
  Unlocking data
    $D_1$
    Bob's signature
Output 0:
  Pay Bob
  Value: 500 units Bob would then broadcast both transactions to the network 106. However, for Bob, this is not the ideal situation as he has to reveal $D_1$ in the transaction. This is considered as a pre-mature closure of the channel. However, if Alice follows proper procedure to close the payment channel (described below), then Bob has no need to do this.

Second Round—Alice's Turn: When Alice receives $D_1$ and is happy with the content, she constructs the following transaction for the next pack of the data. This transaction will also be considered as an acknowledgement of receiving $D_1$.

$TX_2$
Locktime: 0
Input 0:
  Alice's unspent outpoint (we assume it is the same outpoint as in $TX_1$.)
  Alice's signature and SIGHASH_ALL|ANYONECANPAY
Output 1:
  Locking conditions:
    If Bob provides $D_2$ and his signature, he can claim the output.
    Else if both Alice and Bob provide their signatures, Bob can claim the output.
    Else, after 720 blocks, Alice can claim the output.
  Value: 1000 units
Output 1:
  Alice's change
Output 1:
  Pay Bob the same amount as in Output 1

Comparing $TX_1$ and $TX_2$, notice that $D_1$ is changed to $D_2$, and the value for Output 0 is increased from 500 units of the digital asset to 1000 units. As a result of these two changes, the other outputs will have different value (assuming Alice is using the same unspent outpoint). Moreover, as these changes are not done on the malleable part of the transaction, Alice must produce a new signature for $TX_2$.

Second Round—Bob's Turn: When Bob receives $TX_2$, he simply sends Alice $D_2$. As before, Bob is safe to do so as he can claim the payment without Alice's assistant as the same way in the first round: Bob would add an input of his own, again from ($TxID_B$, vout=0), to cover Output 2 in $TX_2$, and creates $TX_2$'; and Bob would also create another transaction, $TX_p$, to claim the payment:

$TX_p$
Locktime: 0
Input 0:
  The outpoint from TXZ Output 0.
  Unlocking data
    $D_2$
    Bob's signature
Output 1:
  Pay Bob
  Value: 1000 units Bob would then broadcasts both transactions to the network.

If Alice and Bob cooperate to close the channel, Bob can avoid doing this as mentioned in the first round.

Final Round—Alice's Turn: After a few rounds, Alice constructs $TX_n$, to request the final pack of the data $D_n$.

$TX_n$
Locktime: 0
Input 0:
  Alice's unspent outpoint (we assume it is the same outpoint as in $TX_1$.)
  Alice's signature and SIGHASH_ALL|ANYONECANPAY
Output 0:
  Locking conditions:
    If Bob provides $D_n$ and his signature, he can claim the output.
    Else if both Alice and Bob provide their signatures, Bob can claim the output.
    Else, after 720 blocks, Alice can claim the output.
  Value: 500n units
Output 1:
  Alice's change
Output 1:
  Pay Bob the same amount as in Output 1

Final Round—Bob's Turn: Bob responds with the final data pack $D_n$.

Closure of the channel: To close the payment channel, there are a few interactions between Alice and Bob. Either Alice or Bob can signal to the other their intention to close the channel 301. Without loss of generality, assume the last pack of data sent from Bob to Alice is $D_n$. Bob finds $TX_p$, the transaction that requests $D_n$, and adds his own input to cover Output 2 to create $TX_n$'. Bob creates $TX_p$ as the following:

$TX_p$
Locktime: 0
Input 0:
  The outpoint from $TX_n$' Output 0.
  Unlocking data
    $D_n$,
    Bob's signature
Output 0:
  Pay Bob
  Value: 500n units Bob sends both transactions, $TX_n$' and $TX_p$, directly to Alice over the payment channel 301. Alice checks $TX_n$' and the input of $TX_p$ are indeed related as she expects. Alice signs $TX_p$ and replaces $D_n$ with her signature to create $TX_p$'.

$TX_p$'
Locktime: 0
Input 0:
  The outpoint from $TX_n$' Output 0.
  Unlocking data
    Alice's signature
    Bob's signature
Output 0:
  Pay Bob
  Value: 500n units Alice sends $TX_p$' to Bob. Bob broadcasts $TX_n$' and $TX_p$' to the network 106. Alternatively Alice could broadcast $TX_n$' and/or $TX_p$', or could send one or both of them to a third party to broadcast on Alice and Bob's behalf. Note that Alice can choose to close the channel at any time.

Note in FIG. 7 how both: (A) the channel can be closed unilaterally by Bob by broadcasting a pair of transactions; and (B) the two transactions forming the pair are both broadcast at the closure of the channel, showing the channel is effectively 'opened' off-chain without communicating with the network 106.

To recap the sequence, in response to $Tx_1$, Bob sends $D_2$ to Alice. Alice sends Bob $Tx_2$ to acknowledge, then Bob sends $D_3$ etc. $Tx_2$ is the same as $Tx_1$ but with $D_1$ replaced with $D_2$ and the amount of output 0 increased. In $Tx_3$, $D_2$ is replaced with $D_3$ and the amount of output 0 increases again. In embodiment the amount in output 0 increases linearly with i, i.e. with each chunk and Tx sent in acknowledgement. Alternatively it is not excluded that another increasing relationship be used, e.g. to give a higher weighting toward the end of the sequence to further incentivize completing the sequence.

Bob can unilaterally claim any one of abased on criterion ii). To do this Bob would malleate it to create Tx. The malleation comprises adding an input of some of Bob's digital asset to make up the difference, then creating another transaction $Tx_p$ containing $D_i$ in its input in order to spend $Tx_i$. $Tx_p$ has an output unconditionally locked to Bob. Bob could add his input and spend one of the earlier transactions $Tx_1$ or $Tx_2$, etc., but it isn't worth it. He'd prefer to keep sending the movie and get the full amount at the end. Also, Bob would prefer not to rely on criterion ii) because the he has to publish one of the chunks of his movie on the blockchain.

Note that the input of each $Tx_1$, $Tx_2$, $Tx_3$ . . . specifies the same UTXO of $Tx_0$. Hence if any one of them is broadcast to the network and validated at any given node 104, then any others of them will no longer be deemed valid at that node (a condition for validity is that the Tx does not attempt to spend a UTXO that has already been validly spent by another transaction). Different nodes 104 may receive different instances first and therefore have conflicting views of which instance is 'valid' before one instance is mined, at which point all nodes 104 agree that the mined instance is the only valid instance. If a node 104 accepts one instance as valid, and then discovers that a second instance has been recorded in the blockchain 150 then that node 104 (must) accept this and will discard (i.e. treat as invalid) the unmined instance which it initially accepted.

If Bob does cash-in early and stop sending the movie, Alice has only paid for one more chunk than she received, so has only lost 500. Alice could bail at any point, but if she does so Bob has never sent her more than one chunk (e.g. 500 unit's worth) of movie that Alice didn't pay for.

The mechanism works because the amount increases each time, starting small then increasing up to the end of the movie; and all the transactions attempt to spend the same UTXO in $Tx_0$, so cashing in any one invalidates any others. Also, in embodiments, the total of the outputs is necessarily greater than the inputs until Bob adds his own input. This is an example of input level malleability.

If Bob and Alice both wait until the end of the movie, Bob will send $Tx_n'$ to Alice for Alice to sign, such that the hash of $D_n$ is replaced with her signature. This enables Bob to claim the full payment without publishing any chunks D of the data. This is an example of script level malleability.

To avoid data congestion on the blockchain, the process uses a locking script that can be unlocked either using some data package or data receiver's signature. By using the malleability of a transaction, the data receiver can replace the data in the unlocking script with her or his signature. This action not only acknowledges that the data has been received or confirms the closure of the payment channel, but also prunes the data from the transaction to save space.

There is no incentive for Bob to publish any transactions other than the last transaction he receives from Alice considering the incremental increase in values of the transactions. If Alice leaves the channel prematurely, then Bob simply publishes the last transaction he receives from Alice, together with a transaction that claims the payment. If he did not receive Alice's malleated transaction, then he has to reveal the relevant data pack to claim the payment. In embodiments, if there is a strong requirement on data confidentiality, then Bob can encrypt the data sent to Alice, and reveal the decryption key in the transaction (see below).

For Alice, however, there could be an incentive to publish the first transaction when she receives enough data packs. It is not certain that she would successfully invalidate the latest communicated transaction as both the first transaction and the latest transaction are valid. To completely avoid this scenario, embodiments include an extra output that makes the transaction itself invalid unless someone covers the deficit between the outputs and the input. For Alice to make the transaction valid, she has to provide an extra input, and that defeats her purpose of broadcasting the transaction.

In the case that Bob goes offline, Alice will not be able to continue watching the movie. However, she never pays more for what she has watched. She can either wait for Bob to come back, or just move on to another service provider and start from where she stops.

Note that there is no funding transaction required for this form of payment channel. Moreover, it is so flexible that Alice can reconnect to resume the streaming service at any point. That is, there is no overhead to establish the payment channel.

Embodiments address all the risks within the payment channel. It may still be possible for Alice to double spend her UTXO outside the payment channel. Embodiments may prevent any one or more of three options to prevent this. One is to adopt techniques to force Alice to reveal the secret key to a deposit account when she tries to double spend the UTXO, in which case, Bob will be able to claim all the deposit. A second option is to also make Alice's acknowledgement legally binding. That is Alice's signature on Bob's payment claim transaction can be regarded as a binding proof of her identity. Any wrongdoing from Alice will be subject to law enforcement. A third option is for Bob to conclude and restart the payment channel from time to time, e.g. every 5 minutes. The frequency can be adjusted by Bob according to his own assessment on the risk. Note that, since there is no funding transaction required, there is no overhead by restarting the payment channel.

Data Encryption: Data confidentiality is often a requirement when data is exchanged over a public network. In the previous section, it has been assumed that the data receiver knows exactly what is expected to be received. However, when data is encrypted, it is hard to know in advance what the ciphertext is or what hash value to expect without any communication. This causes the requirement of constructing the hash puzzle in the locking script. To mitigate this, in embodiments the data seller can communicate the hash value of the ciphertext to the data receiver before transmitting it. The data receiver constructs the payment transaction using the given hash value. When receiving the encrypted data, the data receiver can decrypt the data and verify whether the data is expected. If it is, then everything is fine. If it is not, then the worst case is that the receiver loses the money. However, the amount the receiver can lose is bounded by the price per data pack. In case of a movie, it is probably around 500 units, e.g. adding up to about 5 dollars a movie. Given the small scale of the economic value and much greater implication in reputation, the data seller has no incentive to cheat.

Some embodiments may implement a mechanism to establish a shared secret key from symmetric encryption between the data seller and each data buyer. Therefore, all data in transmission can be encrypted.

Example Use Case 3—Polling & Voting

In another example use case, the different alternative conditions of the first transaction $Tx_1$, as illustrated in FIG. 5 for example, may be used to represent different vote choices in order to use the blockchain 150 as a means for recording votes. Before $Tx_p'$ is mined into a block 151, the choice expressed by Alice in $Tx_p$ can be taken as an indicative poll of her voting intention. In the following example, the first transaction will be referred to as $Tx_{Slip}$, the first version of the second (target) transaction will be referred to as $Tx_{poll}$, and the second version of the target transaction will be referred to as $Tx_{vote}$.

Consider the following example scenario. There is an upcoming election. A governmental body ("Bob" 103b) wishes to incentivise participation in both polling and the vote itself by using a blockchain-based voting system that can remunerate eligible voters for participating. For the sake of illustration say that this is a two-party state, with the "Labour" and "Conservative" parties. The governmental body $P_{Gov}$ is responsible for (a) registration of eligible voters, (b) issuing vote slips, and (c) counting polls and votes. The governmental body is the second party 103b, also referred to as "Bob", in this scenario. The electorate comprises N eligible voters. Each voter ("Alice" 103a) chooses a private 'Vote Token' T v when registering, which is known only to the voter. Bob's government body knows the hash value $H(T_V)$ for each registered voter.

The following definitions may be employed for the polling and voting scenario.

Registration:=a voter uses some off- or on-block process to register as an eligible voter. The voter chooses T v privately and gives Bob's government body $H(T_V)$.

Vote slip ($Tx_{Slip}$):=a transaction, which includes a locking script paying a voter if they participate in the poll and/or vote.

Poll ($Tx_{poll}$):=a signed transaction using either the unlocking condition (I) or (II) to unlock the vote slip output, where (I) and (II) represent polling choices for two respective options, e.g. referendum responses or parties (see the examples below).

Vote ($Tx_{vote}$):=a signed transaction using either unlocking condition (III) or (IV) to unlock the vote slip output, where (III) and (IV) represent vote choices for the two respective options (see again the example conditions below).

Every voter will also have their own public key $P_V$, and in order to poll or vote for their chosen party each will have to sign using a public key that reflects their choice. In the illustrative two-party example, where one of only two parties may be chosen, the two possible public keys for a voter to express their choice with may be the following:

$$P_{V,L} = P_V + SHA256(\text{"Labour"}) \cdot G,$$

$$P_{V,C} = P_V + SHA256(\text{"Conservative"}) \cdot G,$$

where " · " is defined as the operator for "EC point multiplication by a scalar".

Regarding the unlocking conditions, the locking script will be constructed so that it can be unlocked by satisfying any one of four distinct unlocking conditions. Conditions (I) and (III) are both related to "Labour", representing a poll and vote respectively. Conditions (II) and (IV) are both related to "Conservative", representing a poll and vote respectively. The conditions are written in full as follows:

$$<SigP_{V,L}><P_{V,L}><\text{"Labour"}> \quad (I)$$

$$<SigP_{V,C}><P_{V,C}><\text{"Conservative"}> \quad (II)$$

$$<SigP_{Gov}><P_{Gov}><T_V><SigP_{V,L}> \\ <P_{V,L}><\text{"Labour"}> \quad (III)$$

$$<SigP_{Gov}><P_{Gov}><T_V><SigP_{V,C}> \\ <P_{V,C}><\text{"Conservative"}> \quad (IV)$$

Embodiments will use an idea of switching conditions via script-level malleability to switch from:

(I)→(III) convert poll for Labour to vote for Labour, or (II)→(IV) convert poll for Conservative to vote for Conservative.

These switches represent converting a poll to a ("→") vote for the same party. These conversions can be achieved using malleability because the public key used, and therefore the signature, is consistent across the switch—only the rest of the input script data is malleated, so the voter's signature does not need to be changed.

However, if an eligible voter wishes to switch conditions from:

(I)→(II) [switch polling choice from Labour to Conservatives]; or (III)→(IV) [switch voting choice from Labour to Conservatives].

In embodiments this cannot be done using malleability and switching conditions. Alternatively however, this could instead be achieved by incrementing a sequence number of the poll or vote transaction respectively, wherein the message signed by Alice (the voter) includes the sequence number. This means Alice's signature for her poll choice cannot be used by a malicious third party to replay Alice's signature in order to falsify her subsequent vote choice.

The unlocking conditions are used to unlock a particular locking script, whereby each unlocking condition satisfies a distinct locking condition in the locking script. The locking script in question, which may be called herein the 'Vote script', is shown below.

```
OP_DUP OP_HASH256 <H("Labour")> OP_EQUAL
OP_IF
    OP_DROP OP_DUP OP_HASH160 <H(P_V,L)> OP_EQUALVERIFY OP_CHECKSIGVERIFY
    OP_HASH256 <H(T_V)> OP_EQUAL
    OP_IF
        OP_DUP OP_HASH160 <H(P_Gov)> OP_EQUALVERIFY OP_CHECKSIGVERIFY
    OP_ELSE
        OP_1
    OP_ENDIF
OP_ELSE
```

```
OP_HASH256 <H("Conservative")> OP_EQUAL
OP_IF
    OP_DROP OP_DUP OP_HASH160 <H(P_{V,C})> OP_EQUALVERIFY OP_CHECKSIGVERIFY
    OP_HASH256 <H(T_V)> OP_EQUAL
    OP_IF
      OP_DUP OP_HASH160 <H(P_{Gov})> OP_EQUALVERIFY OP_CHECKSIGVERIFY
    OP_ELSE
      OP_1
    OP_ENDIF
OP_ELSE
    OP_0
OP_ENDIF
OP_ENDIF
```

The polling and voting procedure is shown in FIG. 10. This is a sequence diagram showing the full polling and voting process, from the announcement of an election at $t_0$ to the end of the voting period at $t_3$.

This procedure is split into the following steps.

Step 1: Bob's government body $P_{Gov}$ opens voter registration, at time $t_0$, for a vote that will be held at a later time $t_2$. Voters are now free to register and give their hashed tokens H ($T_V$) as part of the registration process.

Step 2: Bob's government body $P_{Gov}$ issues N vote slip transactions $Tx_{Poll}$. Each slip pays and individual voter, with the locking script [Vote script], as shown previously, tailored to that voter's public key $P_V$. Each transaction is lock-timed to a later time $t_2$.

Step 3: A voter Alice, with public key $P_V$, wishes to participate in the polling phase. The polling phase is defined as all times t: $t_0$<t<$t_2$. The voter participates in the poll by making her selection "Labour" and constructing a poll transaction Tx poll (FIG. 11), using unlocking script condition (I).

This transaction can be made public by either the voter, government or a third party, but it cannot be mined until $t_2$.

If the voter wishes to change her poll selection to "Conservative", she must generate a new poll transaction using script condition (II) instead, and increment the sequence number.

Step 4: The voter Alice decides, at some time t 1 that she wishes to convert her poll choice of "Labour" to a vote choice. This involves malleating the unlocking script of the poll transaction to generate a vote transaction. The malleation changes the unlocking condition to script condition (III) [(I)→(III)].

To perform the malleation, at step 4 the voter Alice sends her vote token $T_V$ to Bob's government body. At step 5 Bob's government body switches the poll token for the vote token to turn the poll transaction into a vote transaction, and signs the vote transaction with Sig ($P_{Gov}$, $Tx_{Vote}$) to confirm it is a valid vote. As a variant, the voter could put the vote token in the transaction and send that to the government to sign.

Note that both the poll transaction and the corresponding vote transaction, created later, are invalid at all times t<$t_2$ due to the locktime $t_2$ placed on both transactions.

Step 6: Bob's government body broadcasts all valid vote transactions at $t_2$. It continues to broadcast any other vote transactions finalised at times t: $t_2$<t<$t_3$, where $t_2$ defines the start of the voting period and $t_3$ defines the end of the voting period.

In embodiments the government body never broadcasts poll transactions. It is left at the discretion of the poll-ee (Alice) to broadcast this and claim the reward.

Note that $Tx_{slip}$ also needs to be mined at some point in the process, such that the UTXO spent in $Tx_{poll}/Tx_{vote}$ actually exists. For simplicity this step is not shown in FIG. 10. The actual method used to lock-time the transaction will also slightly impact at what point in the signalling diagram of FIG. 10 that $Tx_{slip}$ gets sent to the network 106. If one puts 'nLocktime' (definition 8) on each $Tx_{slip}$, then $Tx_{slip}$ will also need to be broadcast to be mined in stage 6 of the diagram (and/or the final optional stage). If instead once chooses to put an OP_CLTV or OP_CSV (definitions 10 and 11) in the locking script of $Tx_{slip}$, then $Tx_{slip}$ can be mined at the same time as step 2 described above.

FIG. 11 shows some example transactions that may be used to implement the process. The top transaction is the voting slip transaction $Tx_{Slip}$ that allows members of the electorate to claim funds by polling and/or voting. The output can only be claimed after the voting period has begun at $t_2$. The middle transaction is the polling transaction $Tx_{poll}$ that signifies a voter has selected a choice as part of a poll. Assuming by way of example that the lock-time was implemented using OP_CSV or OP_CLTV, and $Tx_{slip}$ was sent to the network at the same time it is sent to the voters (step 2), then this transaction will be invalid until $t_2$ due to the time-lock placed on the output of $Tx_{Slip}$ which it references in its input. The bottom transaction is the voting transaction $Tx_{vote}$ that signifies a voter has selected a choice as part of a vote. This transaction is the same as $Tx_{poll}$, but it has switched unlocking condition using script-level malleability. This transaction will similarly be invalid until $t_2$.

In embodiments the time-lock is included as part of the output of the first transaction ($Tx_{Slip}$) In an alternative mechanism however would be to time-lock $Tx_{poll}$ rather than $Tx_{Slip}$, to much the same effect.

CONCLUSION

It will be appreciated that the above embodiments have been described by way of example only.

More generally, according to one aspect disclosed herein there is provided a method of recording a target transaction between a first and second party in a blockchain; the method comprising, by computer equipment of the first or second party: obtaining a second, updated version of the target transaction, being updated relative to a pre-existing first version of the target transaction; and instead of the first version, sending the updated version of the target transaction to be propagated through a network of nodes and recorded in a copy of the blockchain maintained at each of at least some of the nodes; wherein the target transaction comprises an input comprising an unlocking script and a pointer to a first output of a first transaction, the first output comprising a locking script specifying a plurality of alternative conditions for unlocking the first output of the first transaction; and wherein the unlocking script of the first version of the target transaction is configured to unlock the first output of the first transaction based on meeting a first of said alternative conditions, and the unlocking script of the updated version is configured to unlock the first output of the first transaction based on meeting a second one of said alternative conditions instead of the first condition.

In embodiments, the method may comprise comprising, by computer equipment of the second party: providing a function enabling the second party to send the first version of the target transaction to be propagated through the network and recorded in the blockchain based on meeting the first condition.

The function may enable the second party to selectively send either of the first or updated versions of the target transaction to be propagated through the network and recorded in the blockchain based on meeting the first or second condition respectively; the method comprising the second party using said function to perform said sending of the updated version to be recorded in the blockchain instead of the first version.

In embodiments, said function may provide the second party with the option to manually select to perform said sending of the first version, and/or said function may be configured to automatically trigger said sending of the first version of the target transaction after expiry of a predetermined time or upon a predetermined event.

In embodiments, the obtaining of the updated version of the target transaction, and the sending of it to be propagated and recorded in the blockchain, may be performed by computer equipment of the second party.

In embodiments, the obtaining of the second version may comprise the second party receiving at least part of the second version from a first party.

In embodiments, the method may comprise, by computer equipment of the second party: obtaining the first version of the target transaction, wherein the unlocking script of the first version of the target transaction may be configured to enable the second party to autonomously unlock the first output of the first transaction based on meeting the first condition.

In embodiments, the second version of the target transaction may be obtained after the first version.

In embodiments, the obtaining of the first version may comprise the second party receiving at least part of the first version from the first party.

In embodiments, the obtaining of the first version may comprise the second party generating the first transaction.

In embodiments, the second condition may require that the unlocking script comprises a cryptographic signature of the first party signing a part of the target transaction excluding the unlocking script. In this case, said obtaining of the updated version of the target transaction comprises obtaining the signature of the first party, and the updated version as sent to be propagated and recorded in the blockchain includes the signature of the first party in the unlocking script.

In embodiments, the first condition may not require a cryptographic signature of the first party.

In embodiments, at least the first condition may require that the unlocking script comprises a cryptographic signature of the second party signing a part of the target transaction excluding the unlocking script.

In embodiments, the second condition may also require that the unlocking script comprises a cryptographic signature of the second party signing a part of the target transaction excluding the unlocking script. In this case, the updated version as sent to be propagated and recorded in the blockchain includes the cryptographic signature of the second party in the unlocking script.

In embodiments, said obtaining of the updated version may comprise: the second party sending the first version to the first party for the first party to malleate into the updated version by adding the signature of the first party. The first and second conditions may require the same signature of the second party signing the same part of the target transaction, such the second party does not need to re-sign the updated version.

In embodiments, the first condition may require a data payload to be included in unlocking script, but the second condition may not require the data payload to be included in the target transaction. In this case the updated version as sent to be propagated over the network and recorded in the blockchain need not include the data payload.

In embodiments, the first condition may require that the unlocking script comprises the data payload and a cryptographic signature of the second party signing a part of the target transaction excluding the unlocking script, but does not require a cryptographic signature of the first party to be included in the target transaction; and the second condition may require that the unlocking script comprises a cryptographic signature of both the first party and the second party, but may not require the data payload to be included in the target transaction. In such embodiments, said obtaining of the updated version of the target transaction comprises obtaining the signature of the first party; and the updated version of the target transaction as sent to be propagated and recorded in the blockchain need not include the data payload, but includes the signatures of the first and second parties in the unlocking script.

In embodiments, the requirement to include the respective data portion is created by hash challenges included in the locking script, the hash challenge comprising a hash of the respective portion of data and a hash function to check that the hash of the respective data portion in the unlocking script matches the hash included in the locking script. The method may comprise, separately to the network and prior to the receiving of the instances of the first transaction, making available a hash set (e.g. hash tree) to the first party, the hash set comprising a hash value for each of the portions of data to enable the second first party to generate the hash challenge for the respective data portion.

In embodiments, the first output of the first transaction may specify a payment for the second party that is redeemed by unlocking the first output according to the first or second condition, wherein the target transaction may comprise an output transferring at least some of the payment to the second party.

In embodiments the method may comprise, by the computer equipment of the second party: streaming a sequence of data portions to the first party, ending with a final portion in the sequence; and in response to each respective one of the data portions, receiving back a respective instance of the first transaction from the first party, the first output of each instance specifying a payment to the second party for the respective portion; wherein the payment increases with each data portion; and wherein said obtaining of the updated version of the target transaction comprises receiving the updated version from the first party following the final portion in the sequence.

In embodiments, the increase may be linear in proportion to the number of data portions sent so far.

In embodiments, each data portion may be a different portion of an item of media content (e.g. audio and/or video content).

Alternatively each data portion may be a different key for accessing a unit of a service (e.g. provision of a utility comprising gas, water or electricity; or rental of a vehicle, real estate or other physical item).

In embodiments, said function may provide the second party with an option, at any point in the sequence, to manually select to perform the sending of the first version of the target transaction to be propagated through the network and recorded in the blockchain to redeem a latest instance of the first transaction in the sequence received from the first party so far. Alternatively or additionally, said function may be configured to automatically perform the sending of the first version to be propagated through the network and recorded in the blockchain to redeem the latest instance of the first transaction if the first party stops sending instances of the first transaction part way through the sequence.

In embodiments, the first transaction may comprise one or more first inputs specifying an input amount, the first output of the first transaction may specify a first payment, and the first transaction may further comprise one or more further outputs specifying one or more further payments such that the total of the payments is greater than the input amount, and the first transaction as received by the second party from the first party may comprise no other inputs to make up the difference. The nodes of the network may be configured to reject a transaction such as the first transaction as invalid if it specifies a total payment greater than a total input amount. In such embodiments, the method may comprise the second party adding a second input to the final or most recent instance of the first transaction to make up the difference, and sending the first transaction with the second input added to be propagated though the network and recorded in the blockchain.

In embodiments, the further outputs may comprise a second output specifying a second payment to the first party equal to the input amount minus the first payment, and a third output specifying a third payment to the second party equal to the second payment.

In embodiments, the locking script includes a third of said alternative conditions, which requires a locktime to have expired and a cryptographic signature of the first party to be included in the unlocking script, thus enabling the first party to redeem the payment in the first output of the first transaction if not redeemed by the second party within the locktime.

In embodiments, each of at least some of the alternative conditions may correspond to different choices for a vote; and the method may comprise: prior to the obtaining of the updated version of the target transaction, accessing, or making available to be accessed by a third party, the unlocking script in the first version as a non-binding indication of voting intention.

In embodiments, a locktime may be included in at least one of the first transaction and the first version of the target transaction, to prevent the network from recording the first version in the blockchain until after a predetermined point in time.

In embodiments, the output of the first transaction may specify a payment that is redeemed by unlocking the first output according to any one of the conditions specified in the locking script, and the target transaction may comprise an output transferring at least some of the payment to the first party.

In embodiments, the alternative conditions may comprise: a first condition corresponding to a polling indication for the first choice, a second condition corresponding to a polling indication for the second choice, a third condition corresponding to a voting selection for the first choice, and a fourth condition corresponding to a voting selection for the second choice; wherein the unlocking script of the first version of the target transaction may be configured to unlock the first output of the first transaction based on meeting the first or second condition; and the unlocking script of the second version of the target transaction may be configured to convert the polling indication to a vote by being configured to unlock the first output of the first transaction based on meeting the third condition instead of the first condition or the fourth condition instead of the second condition.

In the voting case, the first condition may require that the unlocking script of the target transaction includes a cryptographic signature of the first party, signing a part of the target transaction excluding the locking script. The first condition may require that the signature of the first party signs a private voting token. The second condition may require that the unlocking script of the target transaction includes both the signature of the first party and a cryptographic signature of the second party, each signing a part of the target transaction excluding the locking script.

According to another aspect disclosed herein, there is provided a computer program embodied on computer-readable storage and configured so as when run on the computer equipment of the first and/or second party to perform the method of any embodiment disclosed herein.

According to another aspect, there is provided the computer equipment of the first and/or second party, comprising: memory comprising one or more memory units, and processing apparatus comprising one or more processing units; wherein the memory stores code arranged to run on the processing apparatus, the code being configured so as when on the processing apparatus to carry out the method of any embodiment disclosed herein.

According to another aspect disclosed herein, there is provided a computer program embodied on computer-readable storage and configured so as when run on the computer equipment of the second party to perform operations of: obtaining a first version of the target transaction; obtaining a second version of the target transaction; and enabling the second party to selectively send either of the first and second versions to be propagated through a network of nodes and recorded in a copy of the blockchain maintained at at least some of the nodes; wherein the target transaction comprises an input comprising an unlocking script and a pointer to a first output of a first transaction, the first output the first output specifying an amount of a digital asset of a first party and comprising a locking script specifying a plurality of alternative conditions for unlocking the first output of the first transaction; wherein the unlocking script of the first version of the target transaction is configured to unlock the first output of the first transaction based on meeting a first of said alternative conditions, and the unlocking script is configured to unlock the first output of the first transaction based on meeting a second one of said alternative conditions instead of the first condition.

According to another aspect disclosed herein, there is provided a computer program embodied on computer-readable storage and configured so as when run on the computer equipment of the second party to carry out operations of: obtaining a first version of the target transaction; obtaining a second version of the target transaction; and enabling the second party to selectively send either of the first and second versions to be propagated through a network of nodes and recorded in a copy of the blockchain maintained at at least some of the nodes; wherein the target transaction comprises an input comprising an unlocking script and a pointer to a first output of a first transaction, the first output the first output specifying an amount of a digital asset of a first party and comprising a locking script specifying a plurality of alternative conditions for unlocking the first output of the first transaction; wherein the unlocking script of the first version of the target transaction is configured to unlock the first output of the first transaction based on meeting a first of said alternative conditions, and the unlocking script is configured to unlock the first output of the first transaction based on meeting a second one of said alternative conditions instead of the first condition.

According to another aspect disclosed herein, there is provided computer equipment of the second party, comprising memory comprising one or more memory units, and processing apparatus comprising one or more processing units; wherein the memory stores code arranged to run on the processing apparatus, the code being configured so as when on the processing apparatus to perform operations of: obtaining a first version of the target transaction; obtaining a second version of the target transaction; and enabling the second party to selectively send either of the first and second versions to be propagated through a network of nodes and recorded in a copy of the blockchain maintained at at least some of the nodes; wherein the target transaction comprises an input comprising an unlocking script and a pointer to a first output of a first transaction, the first output the first output specifying an amount of a digital asset of a first party and comprising a locking script specifying a plurality of alternative conditions for unlocking the first output of the first transaction; wherein the unlocking script of the first version of the target transaction is configured to unlock the first output of the first transaction based on meeting a first of said alternative conditions, and the unlocking script is configured to unlock the first output of the first transaction based on meeting a second one of said alternative conditions instead of the first condition.

According to another aspect of the present disclosure, there is provided a method of enabling a second party to record a target transaction in a blockchain; the method comprising, by computer equipment of a first party: sending to the second party an updated version of the target transaction, being updated relative to a pre-existing first version of the target transaction, thereby enabling the second party to send the updated version to be propagated through a network of nodes and recorded in a copy of the blockchain maintained at at least some of the nodes; wherein the target transaction comprises an input comprising an unlocking script and a pointer to a first output of a first transaction, the first output comprising a locking script specifying a plurality of alternative conditions for unlocking the first output of the first transaction; wherein the unlocking script of the first version of the target transaction is configured to unlock the first output of the first transaction based on meeting a first of said alternative conditions, and the unlocking script is configured to unlock the first output of the first transaction based on meeting a second one of said alternative conditions instead of the first condition.

According to another aspect disclosed herein, there is provided a set of transactions for recordal in a blockchain, the set comprising, embodied on a computer-readable data medium or media: a first transaction having an output comprising a locking script specifying a plurality of alternative conditions for unlocking the output of the first transaction; a first version of a second transaction having an input comprising an unlocking script and a pointer to the output of the first transaction, wherein the unlocking script of the first version of the target transaction is configured to unlock the output of the first transaction based on meeting a first of said alternative conditions; and a second version of the second transaction having an input comprising an unlocking script and a pointer to the output of the first transaction, wherein the unlocking script is configured to unlock the output of the first transaction based on meeting a second one of said alternative conditions instead of the first condition.

Other variants or use cases of the disclosed techniques may become apparent to the person skilled in the art once given the disclosure herein. The scope of the disclosure is not limited by the described embodiments but only by the accompanying claims.

The invention claimed is:

1. A computer program product for recording a target transaction between a first and second party in a blockchain; the computer program product comprising code embodied on non-transitory computer readable storage media and configured so as when run on one or more processors, the code causes to be performed operations comprising, by computer equipment of the first or second party:
   obtaining a second, updated version of the target transaction, being updated relative to a pre-existing first version of the target transaction; and
   instead of the first version, sending the updated version of the target transaction to be propagated through a network of nodes and recorded in a copy of the blockchain maintained at each of at least some of the nodes;
   wherein the target transaction comprises an input comprising an unlocking script and a pointer to a first output of a first transaction, the first output comprising a locking script specifying a plurality of alternative conditions for unlocking the first output of the first transaction; and
   wherein the unlocking script of the first version of the target transaction is configured to unlock the first output of the first transaction based on meeting a first of said alternative conditions, and the unlocking script of the updated version is configured to unlock the first output of the first transaction based on meeting a second one of said alternative conditions instead of the first condition.

2. The computer program product of claim 1, wherein the operations comprises, by computer equipment of the second party, providing a function enabling the second party to send the first version of the target transaction to be propagated through the network and recorded in the blockchain based on meeting the first condition; and
   wherein said function provides the second party with an option to manually select to perform said sending of the first version.

3. The computer program product of claim 1, wherein the operations comprise, by computer equipment of the second party, providing a function enabling the second party to send the first version of the target transaction to be propagated through the network and recorded in the blockchain based on meeting the first condition; and
   wherein said function is configured to automatically trigger said sending of the first version of the target transaction after expiry of a predetermined time or upon a predetermined event.

4. The computer program product of claim 1, wherein the second condition requires that the unlocking script comprises a cryptographic signature of the first party signing a part of the target transaction excluding the unlocking script; and wherein said obtaining of the updated version of the target transaction comprises obtaining the signature of the first party, and the updated version as sent to be propagated and recorded in the blockchain includes the signature of the first party in the unlocking script.

5. The computer program product of claim 4, wherein the first condition does not require a cryptographic signature of the first party.

6. The computer program product of claim 1, wherein the first output of the first transaction specifies a payment for the second party that is redeemed by unlocking the first output according to the first or second condition, and wherein the target transaction comprises an output transferring at least some of the payment to the second party.

7. The computer program product of claim 6, wherein the operations comprise, by the computer equipment of the second party:
streaming a sequence of data portions to the first party, ending with a final portion in the sequence;
in response to each respective one of the data portions, receiving back a respective instance of the first transaction from the first party, the first output of each instance specifying a payment to the second party for the respective portion;
wherein the payment increases with each data portion; and
said obtaining of the updated version of the target transaction comprises receiving the updated version from the first party following the final portion in the sequence.

8. The computer program product of claim 7 wherein the increase is linear in proportion to a number of data portions sent so far.

9. The computer program product of claim 7, wherein each data portion is a different portion of an item of media content.

10. The computer program product of claim 7, wherein each data portion is a different key for accessing a unit of a service.

11. The computer program product of claim 10, wherein the service comprises one of:
provision of a utility comprising electricity, gas or water; or
rental of real estate, a vehicle or another physical item.

12. The computer program product of claim 7, wherein the operations comprise, by computer equipment of the second party, providing a function enabling the second party to send the first version of the target transaction to be propagated through the network and recorded in the blockchain based on meeting the first condition; and wherein:
said function provides the second party with an option, at any point in the sequence, to manually select to perform the sending of the first version of the target transaction to be propagated through the network and recorded in the blockchain to redeem a latest instance of the first transaction in the sequence received from the first party so far; and/or
said function is configured to automatically perform the sending of the first version to be propagated through the network and recorded in the blockchain to redeem the latest instance of the first transaction if the first party stops sending instances of the first transaction part way through the sequence.

13. The computer program product of claim 7, wherein: the first transaction comprises one or more first inputs specifying an input amount, the first output of the first transaction specifies a first payment, the first transaction further comprises one or more further outputs specifying one or more further payments such that a total of the payments is greater than the input amount, and the first transaction as received by the second party from the first party comprises no other inputs to make up the difference, the nodes of the network being configured to reject the first transaction as invalid if it specifies a total payment greater than a total input amount; and
the operations comprises the second party adding a second input to the final or most recent instance of the first transaction to make up the difference, and sending the first transaction with the second input added to be propagated though the network and recorded in the blockchain.

14. The computer program product of claim 13, wherein the further outputs comprise a second output specifying a second payment to the first party equal to the input amount minus the first payment, and a third output specifying a third payment to the second party equal to the second payment.

15. The computer program product of claim 6, wherein the locking script includes a third of said alternative conditions, which requires a locktime to have expired and a cryptographic signature of the first party to be included in the unlocking script, thus enabling the first party to redeem the payment in the first output of the first transaction if not redeemed by the second party within the locktime.

16. The computer program product of claim 1, wherein:
each of at least some of the alternative conditions correspond to different choices for a vote; and
the operations comprise, prior to the obtaining of the updated version of the target transaction, accessing, or making available to be accessed by a third party, the unlocking script in the first version as a non-binding indication of voting intention.

17. The computer program product of claim 16, wherein a locktime is included in at least one of the first transaction and the first version of the target transaction, to prevent the network from recording the first version in the blockchain until after a predetermined point in time.

18. The computer program product of claim 16, wherein the output of the first transaction specifies a payment that is redeemed by unlocking the first output according to any one of the conditions specified in the locking script, and wherein the target transaction comprises an output transferring at least some of the payment to the first party.

19. The computer program product of claim 16, wherein the alternative conditions comprise:
a first condition corresponding to a polling indication for the first choice,
a second condition corresponding to a polling indication for the second choice,
a third condition corresponding to a voting selection for the first choice,
a fourth condition corresponding to a voting selection for the second choice;
wherein the unlocking script of the first version of the target transaction is configured to unlock the first output of the first transaction based on meeting the first or second condition,
the unlocking script of the second version of the target transaction is configured to convert the polling indication to a vote by being configured to unlock the first output of the first transaction based on meeting the third condition instead of the first condition or the fourth condition instead of the second condition.

20. A set of transactions for recordal in a blockchain, the set comprising, embodied on a non-transitory computer-readable data medium or media:
- a first transaction having an output comprising a locking script specifying a plurality of alternative conditions for unlocking the output of the first transaction;
- a first version of a second transaction having an input comprising an unlocking script and a pointer to the output of the first transaction, wherein the unlocking script of the first version of the second transaction is configured to unlock the output of the first transaction based on meeting a first of said alternative conditions; and
- a second version of the second transaction having an input comprising an unlocking script and a pointer to the output of the first transaction, wherein the unlocking script is configured to unlock the output of the first transaction based on meeting a second one of said alternative conditions instead of the first condition.

* * * * *